United States Patent
Bi

(10) Patent No.: US 10,146,764 B2
(45) Date of Patent: Dec. 4, 2018

(54) DYNAMIC KEY MAPPING OF A GRAPHICAL KEYBOARD

(71) Applicant: Google Inc., Mountain View, CA (US)

(72) Inventor: Xiaojun Bi, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 211 days.

(21) Appl. No.: 15/089,889

(22) Filed: Apr. 4, 2016

(65) Prior Publication Data

US 2017/0286395 A1 Oct. 5, 2017

(51) Int. Cl.
G06F 17/27 (2006.01)
G06F 3/0488 (2013.01)
G06F 3/0484 (2013.01)
G06F 3/0489 (2013.01)
G06F 17/24 (2006.01)

(52) U.S. Cl.
CPC ........ *G06F 17/276* (2013.01); *G06F 3/04842* (2013.01); *G06F 3/04845* (2013.01); *G06F 3/04886* (2013.01); *G06F 3/04895* (2013.01); *G06F 17/24* (2013.01)

(58) Field of Classification Search
CPC .............. G06F 17/276; G06F 3/04842; G06F 3/04845; G06F 3/04866; G06F 3/04895; G06F 17/24; G06F 3/0237
See application file for complete search history.

(56) References Cited

U.S. PATENT DOCUMENTS 9,128,610 B2 9/2015 Causey et al.
9,134,810 B2 9/2015 Griffin et al.
2005/0275632 A1 12/2005 Kent et al.
2006/0112347 A1 5/2006 Baudisch
2012/0047454 A1 2/2012 Harte
(Continued)

FOREIGN PATENT DOCUMENTS

EP 2778861 A1 9/2014
WO 2014146131 A1 9/2014

OTHER PUBLICATIONS

Boost Technology—SmartKey Technology; Retrieved on Feb. 1, 2016 from http://www.boosttechnology.com/smartkeys.html; 3 pgs.
(Continued)

*Primary Examiner* — Jeffrey A Gaffin
*Assistant Examiner* — Bille M Dahir
(74) *Attorney, Agent, or Firm* — Shumaker & Sieffert, P.A.

(57) ABSTRACT

A computing device is described that outputs, for display at a presence-sensitive display, a graphical keyboard comprising a plurality of keys. The computing device determines, based on an initial selection of one or more keys from the plurality of keys, one or more candidate words. The computing device also determines, based on the one or more candidate words, a probability that a particular key will be selected after the initial selection of the one or more keys. Responsive to determining that the probability does not satisfy a probability threshold, the computing device outputs, for display at the presence-sensitive display, an updated graphical keyboard that includes a graphical indication designating an area of the graphical keyboard associated with the particular key as being an additional portion of the graphical keyboard for selecting a character associated with an adjacent key.

19 Claims, 9 Drawing Sheets

(56) References Cited

U.S. PATENT DOCUMENTS

| | | | |
|---|---|---|---|
| 2013/0346905 A1 | 12/2013 | Do et al. | |
| 2014/0192004 A1* | 7/2014 | Andersson | G06F 3/0237 345/173 |
| 2016/0034181 A1* | 2/2016 | Norris, III | G06F 3/0236 715/773 |

OTHER PUBLICATIONS

International Search Report and Written Opinion of International Application No. PCT/US2016/068306, dated Mar. 31, 2017, 15 pp.
Gunawardana et al., "Usability Guided Key-Target Resizing for Soft Keyboards," Proceedings of the 15th International Conference on Intelligent User Interfaces, Feb. 7, 2010, 8 pp.
Response to Written Opinion dated Mar. 31, 2017, from International Application No. PCT/US2016/068306, filed Feb. 2, 2018, 11 pp.
Second Written Opinion of International Application No. PCT/US2016/068306, dated Feb. 28, 2018, 7 pp.
International Preliminary Report on Patentability from International Application No. PCT/US2016/068306, dated Jun. 25, 2018, 17 pp.

* cited by examiner

DYNAMIC KEY MAPPING OF A GRAPHICAL KEYBOARD

BACKGROUND

Some computing devices (e.g., mobile phones, tablet computers, computerized watches, etc.) may provide a graphical keyboard input feature as part of a graphical user interface for composing text using a presence-sensitive input device such as a touchscreen. In some examples, the keys of a graphical keyboard provided by the computing device may be relatively small, which may lead to incorrect keys inadvertently being selected thereby causing spelling mistakes or grammatical errors. Some computing devices utilize language model based auto-correction and word suggestion techniques to automatically correct errors and generally assist a user in inputting text. However, auto-correction and word suggestion techniques are not always accurate and in some instances, a user may need to provide additional input to remove, delete, or otherwise correct an erroneous auto-correction.

SUMMARY

In one example, the disclosure is directed to a method that includes outputting, by a computing device, for display at a presence-sensitive display, a graphical keyboard comprising a plurality of keys. The method also includes determining, by the computing device, based on an initial selection of one or more keys from the plurality of keys, one or more candidate words. The method also includes determining, by the computing device, based on the one or more candidate words, a probability that a particular key will be selected after the initial selection of the one or more keys. The method further includes, responsive to determining that the probability does not satisfy a probability threshold, outputting, by the computing device, for display at the presence-sensitive display, an updated graphical keyboard that includes a graphical indication designating an area of the graphical keyboard associated with the particular key as being an additional portion of the graphical keyboard for selecting a character associated with an adjacent key.

In another example, the disclosure is directed to a computing device that includes a presence-sensitive display, at least one processor, and a memory. The memory includes instructions that, when executed by the at least one processor, cause the at least one processor to output, for display at the presence-sensitive display, a graphical keyboard comprising a plurality of keys. The memory includes additional instructions that, when executed by the at least one processor, cause the at least one processor to determine, based on an initial selection of one or more keys from the plurality of keys, one or more candidate words, and determine, based on the one or more candidate words, a probability that a particular key will be selected after the initial selection of the one or more keys. The memory includes additional instructions that, when executed by the at least one processor, cause the at least one processor to, responsive to determining that the probability does not satisfy a probability threshold, output, for display at the presence-sensitive display, an updated graphical keyboard that includes a graphical indication designating an area of the graphical keyboard associated with the particular key as being an additional portion of the graphical keyboard for selecting a character associated with an adjacent key.

In another example, the disclosure is directed to a computer-readable storage medium encoded with instructions that, when executed by at least one processor of a computing device, cause the at least one processor to output, for display at a presence-sensitive display, a graphical keyboard comprising a plurality of keys. The instructions, when executed, further cause the at least one processor of the computing device to determine, based on an initial selection of one or more keys from the plurality of keys, one or more candidate words, and determine, based on the one or more candidate words, a probability that a particular key will be selected after the initial selection of the one or more keys. The instructions, when executed, further cause the at least one processor of the computing device to, responsive to determining that the probability does not satisfy a probability threshold, output, for display at the presence-sensitive display, an updated graphical keyboard that includes a graphical indication designating an area of the graphical keyboard associated with the particular key as being an additional portion of the graphical keyboard for selecting a character associated with an adjacent key.

The details of one or more examples are set forth in the accompanying drawings and the description below. Other features, objects, and advantages of the disclosure will be apparent from the description and drawings, and from the claims.

DETAILED DESCRIPTION

In general, this disclosure is directed to techniques for enabling a computing device to map and optionally visually designate one or more keys of a graphical keyboard that are not likely to be selected by a user to adjacent keys that are more likely to be selected by the user. The computing device may determine a probability that a particular key will be selected by a subsequent input. If the probability that the particular key will be selected does not satisfy a probability threshold, the computing device may output a graphical indication that indicates the computing device will interpret a selection of the particular key as a selection of a different key that is adjacent to the particular key that is more likely to be selected by the subsequent input. After outputting the graphical indication designating the particular key as a selection of the key adjacent to the particular key, the computing device may detect an input to select the particular key and interpret the input as a selection of the key adjacent to the particular key.

For instance, the computing device may receive an initial user input selecting a "Z" key of a graphical keyboard. Following the selection of the "Z" key, the computing device may determine the probability that the "W" key will be selected after the "Z" key (e.g., particularly when inputting a word from a lexicon) is very low (e.g., zero percent). The computing device may further determine the probability that the "E" key (which in a QWERTY keyboard layout is adjacent to the "W" key) will be selected after the "Z" key is relatively high (e.g., ninety percent) or at least greater than the probability that the "W" key will be selected. As a result, the computing device may output a visual indication that identifies the "W" key as corresponding to a selection of the "E" key. For example, the computing device may update the display of the graphical keyboard and combine the "W" key and the "E" key into a graphical representation of a single key such that the computing device interprets any subsequent selection of the single key as being a selection of the "E" key.

In this way, the techniques described in this disclosure may enable a computing device to output a visual indication that designates an area of the graphical keyboard associated with a key having a low probability of being selected as part of a key for selecting an adjacent key that has a higher probability of being selected. By outputting the visual indication, the computing device may select the correct key more frequently. By selecting the correct key more frequently, the computing device may receive fewer inputs to fix incorrect key selections, which may reduce the overall number of user inputs received by the computing device. A computing device that receives fewer inputs may perform fewer operations and, as such, consume less electrical power.

Figure 1:
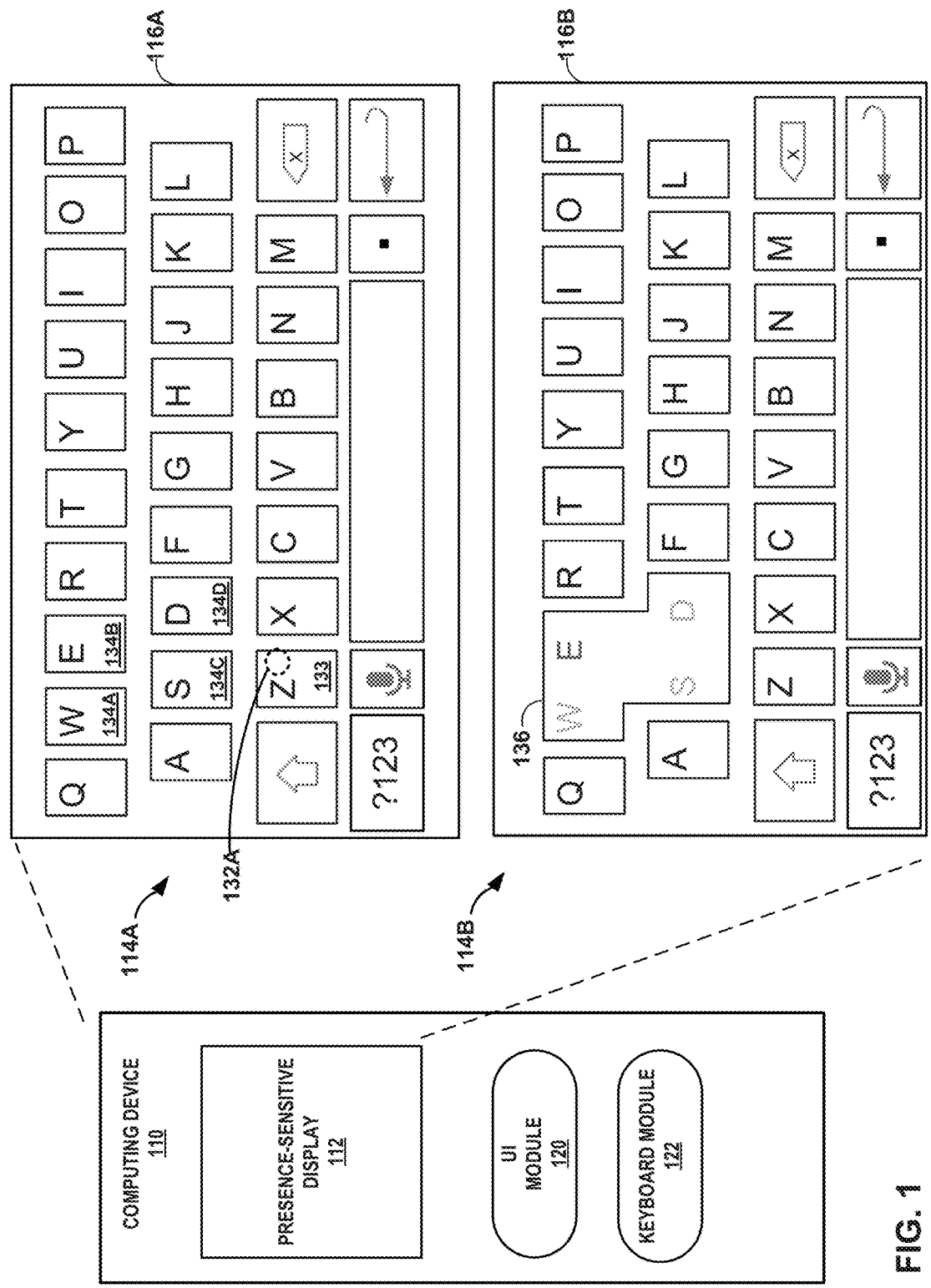
FIG. 1 is a conceptual diagram illustrating an example computing device that is configured to present a graphical keyboard, in accordance with one or more aspects of the present disclosure.

FIG. 1 is a conceptual diagram illustrating computing device 110 as an example computing device that is configured to present a graphical keyboard, in accordance with one or more aspects of the present disclosure. Computing device 110 may represent a mobile device, such as a smart phone, a tablet computer, a laptop computer, computerized watch, computerized eyewear, computerized gloves, or any other type of portable computing device. Additional examples of computing device 110 include desktop computers, televisions, personal digital assistants (PDA), portable gaming systems, media players, e-book readers, mobile television platforms, automobile navigation and entertainment systems, vehicle cockpit displays, or any other types of wearable and non-wearable, mobile or non-mobile computing devices that may output a graphical keyboard for display.

Computing device 110 includes a presence-sensitive display (PSD) 112, user interface (UI) module 120, and keyboard module 122. Modules 120 and 122 may perform operations described using software, hardware, firmware, or a mixture of hardware, software, and firmware residing in and/or executing at computing device 110. Computing device 110 may execute modules 120 and 122 with multiple processors or multiple devices. Computing device 110 may execute modules 120 and 122 as virtual machines executing on underlying hardware. Modules 120 and 122 may execute as one or more services of an operating system or computing platform. Modules 120 and 122 may execute as one or more executable programs at an application layer of a computing platform.

PSD 112 of computing device 110 may function as respective input and/or output devices for computing device 110. PSD 112 may be implemented using various technologies. For instance, PSD 112 may function as input devices using presence-sensitive input screens, such as resistive touchscreens, surface acoustic wave touchscreens, capacitive touchscreens, projective capacitance touchscreens, pressure sensitive screens, acoustic pulse recognition touchscreens, or another presence-sensitive display technology. PSD 112 may also function as output (e.g., display) devices using any one or more display devices, such as liquid crystal displays (LCD), dot matrix displays, light emitting diode (LED) displays, organic light-emitting diode (OLED) displays, e-ink, or similar monochrome or color displays capable of outputting visible information to a user of computing device 110.

PSD 112 may receive tactile input from a user of respective computing device 110. PSD 112 may receive indications of tactile input by detecting one or more gestures from a user (e.g., the user touching or pointing to one or more locations of PSD 112 with a finger or a stylus pen). PSD 112 may output information to a user as a user interface (e.g., user interfaces 114A-114B (collectively, "user interfaces" 114), which may be associated with functionality provided by computing device 110. For example, PSD 112 may present various user interfaces related to keyboards or other features of computing platforms, operating systems, applications, and/or services executing at or accessible from computing device 110 (e.g., electronic message applications, Internet browser applications, mobile or desktop operating systems, etc.).

UI module 120 manages user interactions with PSD 112 and other components of computing device 110. For example, UI module 120 may output a user interface and may cause PSD 112 to display the user interface as a user of computing device 110 views output and/or provides input at PSD 112. UI module 120 may receive one or more indications of input from a user as the user interacts with the user interfaces (e.g., PSD 112). UI module 120 may interpret inputs detected at PSD 112 and may relay information about the detected inputs to one or more associated platforms, operating systems, applications, and/or services executing at computing device 110, for example, to cause computing device 110 to perform functions.

In some examples, UI module 120 may cause PSD 112 to present user interfaces user interfaces 114. User interfaces 114 include graphical elements displayed at various locations of PSD 112. For example, as illustrated in FIG. 1, user interfaces 114 include respective graphical keyboards 116A-116B (collectively, "graphical keyboards 116). Graphical keyboards 116 includes graphical elements displayed as keys. Each key may be associated with a respective character (e.g., a letter, number, punctuation, or other character) representative of the key. In some examples, user interfaces 114 may include an edit region (not shown in FIG. 1) that includes graphical elements displayed as characters of text (e.g., a word) and a suggested word region (not shown in FIG. 1) that includes selectable spelling corrections and/or selectable word suggestions. A user of computing device 110 may enter text in the edit region by providing user input at locations of PSD 112 that display the keys of graphical keyboards 1116. In response to receiving a user input, computing device 110 may output one or more suggested words in the suggested word region.

UI module 120 may act as an intermediary between various components of computing device 110 to make determinations based on input detected by PSD 112 and generate output presented by PSD 112. For instance, keyboard module 122 of computing device 110 may transmit, as output to UI module 120, a keyboard layout including a plurality of keys related to one or more written languages (e.g., English, Spanish, Chinese, Korean, Arabic or any other written language). Keyboard module 122 may assign one or more characters or operations to each key of the plurality of keys in the keyboard layout. For instance, keyboard module 122 may generate a QWERTY keyboard layout including keys that represent characters used in typing the English language. The QWERTY keyboard layout may also include keys that represent operations used in typing the English language (e.g., backspace, delete, spacebar, enter, etc.).

In the example of FIG. 1, computing device 110 outputs for display graphical keyboard 116A comprising a plurality of keys. For example, keyboard module 122 may generate data that includes a representation of graphical keyboard 116A. UI module 120 may generate user interface 114A and include graphical keyboard 116A in user interface 114A based on the data representing graphical keyboard 116A. UI module 120 may send information to PSD 112 that includes instructions for displaying user interface 114A at PSD 112. PSD 112 may receive the information and display user interface 114A, including graphical keyboard 116A.

Computing device 110 may receive an indication of a user input detected at a presence-sensitive input device. For example, as PSD 112 presents user interface 114A, a user may provide one or more user inputs at a location(s) of PSD 112 where PSD 112 presents graphical keyboard 116A. UI module 120 may detect the one or more user inputs at PSD 112 and may output, to keyboard module 122, information about the user inputs. For instance, UI module 120 may output one or more touch events to keyboard module 122 for each user input received by PSD 112. A touch event may include information indicative of the received user input, such as a location component (e.g., [x, y] coordinates) of the user input, a time component (e.g., when the user input was received), a force component (e.g., an amount of pressure applied by the user input), or other data indicative of the user input. Keyboard module 122 may receive, from UI module 120, one or more touch events from UI module 120. Keyboard module 122 may also receive, from UI module 120, data representative of the locations of PSD 112 at which PSD 112 presents each of the keys of graphical keyboard 116A.

Responsive to receiving the one or more touch events, keyboard module 122 may determine, based on the locations of the keys and the one or more touch events, whether the user input corresponds to a particular key. To determine whether the user input corresponds to a particular key, keyboard module 122 may include a spatial model. In general, a spatial model may generate one or more probabilities that a particular key of a graphical keyboard has been selected based on location data associated with a user input. In some examples, a spatial model includes a bivariate Gaussian model for a particular key. The bivariate Gaussian model for a key may include a distribution of coordinates (e.g., [x, y] coordinate pairs) that correspond to locations of PSD 112 that present the given key. More specifically, in some examples, a bivariate Gaussian model for a key may include a distribution of coordinates that correspond to locations of PSD 112 that are most frequently selected by a user when the user intends to select the given key. A shorter distance between location data of a user input and a higher density area of the spatial model, the higher the probability that the key associated with the spatial model has been selected. A greater distance between location data of a user input and a higher density area of the spatial model, the lower the probability that the key associated with the spatial model has been selected. The spatial model of keyboard module 122 may compare the location components (e.g., coordinates) of the one or more touch evens to respective locations of one or more keys of graphical keyboard 116A and generate, based on these comparisons, a probability that a selection of a key occurred.

For example, UI module 120 may detect one or more user inputs at one or more locations of PSD 112 and may select one or more keys based on the one or more user inputs. UI module 120 may detect a user input at location 132A of PSD 112 and may output a touch event to keyboard 122 based on the detected user inputs. The spatial model of keyboard module 122 may compare the location component of the touch event corresponding to the user input to a key location of a particular key (e.g., key 133) of graphical keyboard 116A. The location component of the touch event may include a location of PSD 112. A key location (e.g., a centroid of a key) of a key in graphical keyboard 116A may include a different location of PSD 112. The spatial model of keyboard module 122 may determine a Euclidian distance between the two locations and generate a probability based on the Euclidian distance that the key was selected. The spatial model of keyboard module 122 may correlate a higher probability to a key that shares a smaller Euclidian distance with a touch event than a key that shares a greater Euclidian distance with the touch events. Based on the spatial model probability associated with each key, keyboard module 122 may select the key with the highest spatial model probability (e.g., key 133).

Figure 4A:
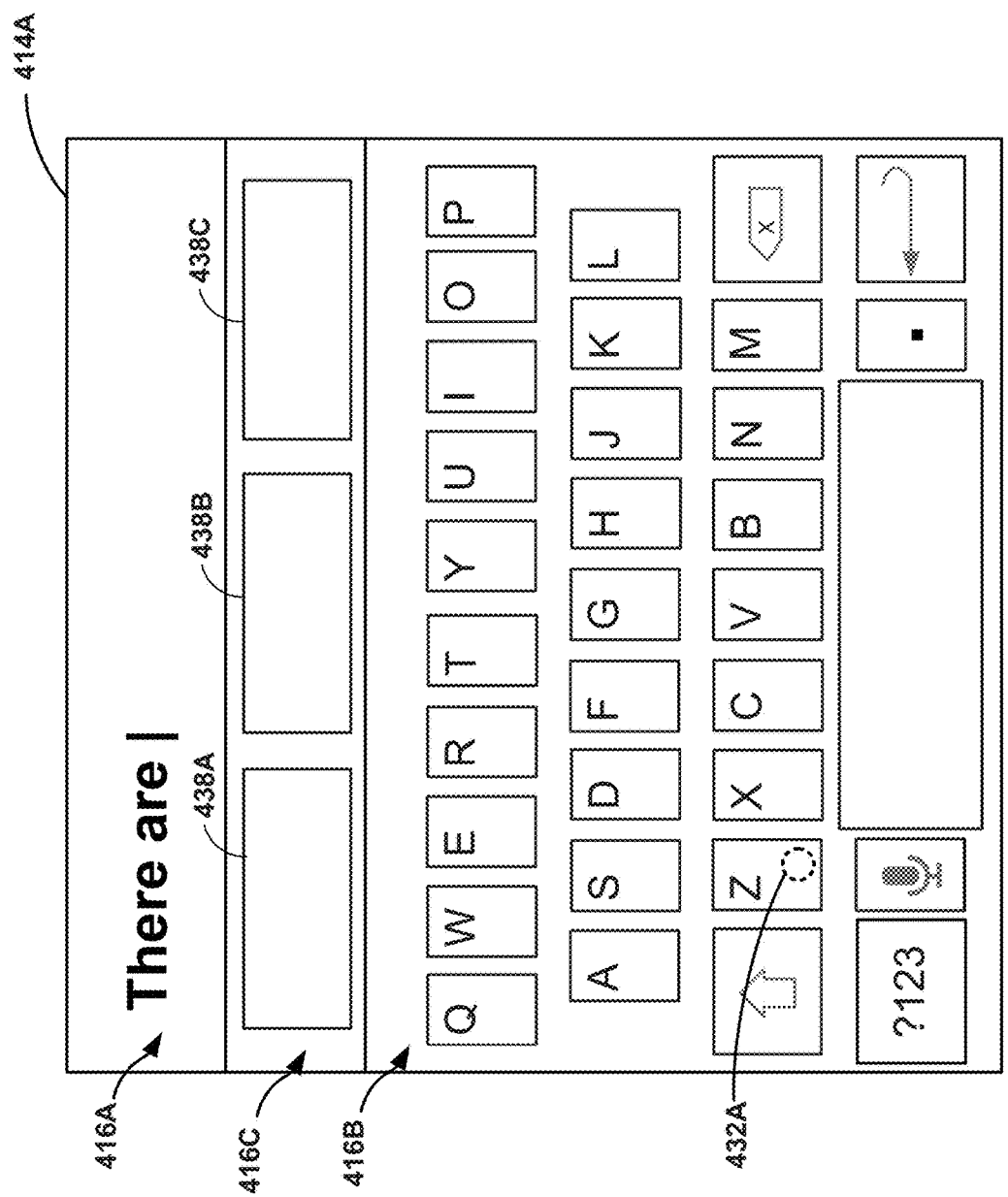
FIGS. 4A-4E are conceptual diagrams illustrating example graphical user interfaces of an example computing device that is configured to present a graphical keyboard, in accordance with one or more aspects of the present disclosure.

Responsive to selecting key 133, keyboard module 122 may output an indication of a character associated with the selected key 133. For example, each key of the keyboard may represent a character or a keyboard operation. Keyboard module 122 may determine, based on the touch events, a particular character represented by one or more key selections. A character such as a number or a lowercase letter may require a single character key selection (e.g., <letter-key>, <number-key>, etc.) and a character such as a capitalized letter may require two key selections (e.g., <shift-key>+<letter-key>, etc.). Responsive to determining a character associated with first key 133, keyboard module 122 may output an indication of the character associated with selected first key 133. For instance, keyboard module 122 may output an indication of the character "z". UI module 120 may receive the indication of the character associated with the selected key and update user interface 114A to include the character at an edit region of a user interface (e.g., edit region 416A as shown in FIG. 4A). UI module 120 may output the updated user interface 114A causing PSD 112 to display the updated user interface.

In some examples, keyboard module 122 may determine, based on the initial selection of key 133, one or more candidate words associated with key 133. For example, keyboard module 122 may compare the character "z" to one or more words in a lexicon. The lexicon of computing device 110 may include a list of words within a written language vocabulary (e.g., a dictionary). For instance, the lexicon may include a database of words (e.g., words in a standard dictionary and/or words added to a dictionary by a user or computing device 110). Keyboard module 22 may perform a lookup in the lexicon, of a character string, to identify one or more candidate words that include parts or all of the characters of the character string. For example, keyboard module 122 may determine one or more candidate words of the lexicon that start with the same character as the selected key. In other words, continuing the example where the selected key corresponds to the character "z", keyboard module 122 may determine which words in the lexicon begin with the character "z". Keyboard module 122 may determine that the one or more candidate words include all of the words in the lexicon that begin with the character "z".

Keyboard module 122 may determine the probability that a particular key will be selected after the initial selection of key 133. Similarly, keyboard module 122 may determine the probability that a key adjacent to the particular key will be selected after the initial key 133. In some instances, keyboard module 122 may determine a respective probability that each respective key of the plurality of keys will be selected after the initial selection. In other instances, keyboard module 122 may determine a respective probability that each respective key in a subset of keys (e.g., keys corresponding to letters and punctuation) of the plurality of keys will be selected after the first key 133.

In some examples, keyboard module 122 may determine the probability based at least in part on a history of key selections. For example, if a user of computing device 110 frequently selects the key associated with the character "a" after selecting key 133, keyboard module 122 may determine the probability of selecting the key associated with the character "a" is high (e.g., greater than fifty percent).

In some examples, keyboard module 122 may determine the probability that a particular key will be selected after an initial selection of one or more keys (e.g. key 133) based at least in part on the one or more candidate words. For example, keyboard module 122 may determine, based at least in part on the one or more candidate words, the probability that key 134A will be selected after key 133. For instance, continuing the example where the initial selected key is key 133, which corresponds to the character "z", keyboard module 122 may determine a set of unique characters in the one or more candidate words that follow the character "z". If there are no instances, or relatively few instances, of the character associated with key 134A (e.g., the letter "w") following the characters associated with key 133 (e.g., the letter "z") within the one or more candidate words, keyboard module 122 may determine that the probability that key 134A will be selected after key 133 is low (e.g., less than ten percent). For instance, in the example illustrated in FIG. 1, where key 133 corresponds to the character "z" and key 134A corresponds to the character "w", the one or more candidate words may include zero, or relatively few, words that begin with the characters "zw". Therefore, keyboard module 122 may determine the probability that key 134A will be selected after key 133 is low.

Similarly, keyboard module 122 may determine the probability that a key adjacent to key 134A (e.g., key 134B) will be selected after an initial key based at least in part on the one or more candidate words. For instance, if key 134B corresponds to the character "e", keyboard module 122 may determine whether the one or more candidate words begin with the letters "ze". Because the combination of letters "ze" may occur in the one or more candidate words more often that the combination of letters "zw", keyboard module 122 may determine that the probability that key 134B will be selected after key 133 is greater than the probability that key 134A will be selected after key 133.

Keyboard module 122 may determine the respective probabilities that additional keys (e.g., key 134C and key 134D) will be selected after key 133. For example, if there are no or relatively few words in the one or more candidate words that begin with the combination of characters "zs" or "zd", keyboard module may determine that the probability that key 134C will be selected after key 133 or the probability that key 134D will be selected after key 133 is low (e.g., zero percent).

In some examples, keyboard module 122 may compare the probability that a particular key will be selected after the initial selection of one or more keys (e.g., key 133) to a probability threshold (e.g., a probability greater than zero percent). Responsive to determining that the probability that key 134A will be selected does not satisfy the probability threshold (e.g., the probability that key 134A will be selected is less than or equal to the probability threshold), UI module 120 may output an updated graphical user interface that includes an updated graphical keyboard. In some examples, the updated graphical keyboard may include a graphical indication designating an area of the graphical keyboard associated with key 134A as being an additional portion of the graphical keyboard for selecting a character associated with a key adjacent to key 134A (e.g., key 134B). Similarly, in some examples, keyboard module 122 may determine that the respective probabilities of selecting a different key (e.g., keys 134C and/or 134D) does not satisfy the probability threshold. Responsive to determining that the respective probability of selecting a respective different key does not satisfy the probability threshold, UI module 120 may output an updated graphical user interface that includes a graphical indication designating an area of the graphical keyboard associated with one or more keys as being an additional portions of the graphical keyboard for selecting the character associated an adjacent key (e.g., key 134B). In some examples, the area of the graphical keyboard associated with a particular key (e.g., key 134B) may include the area at which the particular key is displayed and a buffer region surrounding the particular key.

In some examples, the graphical indication may include outputting a single key 136 at the same region of PSD 112 at which the particular key and the adjacent key were previously displayed. For example, outputting a single key 136 may include removing one or more visual breaks (e.g., one or more lines or borders) between the particular key and the adjacent key such that the two keys are displayed as a single key. For instance, as illustrated by graphical user interface 114B, updated graphical keyboard 114B does not include a border between the character "W" and the character "E". As another example, outputting a single key 136 may include outputting a combined border around one or more keys. For instance, as illustrated by graphical user interface 114B, the "W", "E", "S", and "D" keys share a combined border. As illustrated by user interface 114B, the single key 136 includes the characters associated with the particular keys 134A, 134C, and 134D and the character associated with the adjacent key 134B. In other words, the characters "W", "E", "S", and "D" may be displayed by PSD 112. However, in some examples, the characters of particular keys (e.g., the characters "W", "S", and "D") may not be displayed by PSD 112, such that only the character of the adjacent key (e.g., the "E" key) is displayed within single key 136. In some examples, the graphical indication designating one or more keys as an additional key for selecting the character associated an adjacent key may include changing a display color associated with the one or more keys. In some examples, the graphical indication may include changing a font (e.g., font type, size, formatting, or other characteristic of the font) associated with the one or more keys.

For ease of illustration only, FIG. 1 illustrates a graphical indication designating the area of the graphical keyboard associated with three keys (keys 134A, 134C, and 134D) as additional portions of the graphical keyboard for selecting the character associated with an adjacent key (key 134B). However, it should be understood that areas of the graphical keyboard associated with additional keys may also be designated as additional portions of the graphical keyboard for selecting adjacent key 134B. It should also be understood that areas of the graphical keyboard associated with one or more keys may be designated as additional portions of the graphical keyboard for selecting a key other than key 134B. Further, it should also be understood that UI module may cause PSD 112 to simultaneously output more than one graphical indication. For example, UI module may cause PSD 112 to output a first graphical indication designating an that area of the graphical keyboard associated with a first key as an additional portion of the graphical keyboard for selecting a second key adjacent to the first key and a second graphical indication designating an that area of the graphical keyboard associated with a third key as an additional portion of the graphical keyboard for selecting a fourth key adjacent to the third key.

In this way, the techniques of the disclosure may enable a computing device to output a graphical indication designating an area of the graphical keyboard associated with one or more keys as being an additional portion of the graphical keyboard for selecting a key adjacent to the one or more keys. By outputting a graphical indication of the designation, the computing device may enable a user more easily visualize whether a key will be interpreted as a different key and determine whether the computing device will correctly interpret the user input. By visually indicating which key the computing device will select for a given user input, the computing device may receive fewer inputs from a user having to correct the key selection. By receiving fewer inputs, the computing device may process fewer user inputs, execute fewer operations, and as a result, consume less electrical power.

Figure 2:
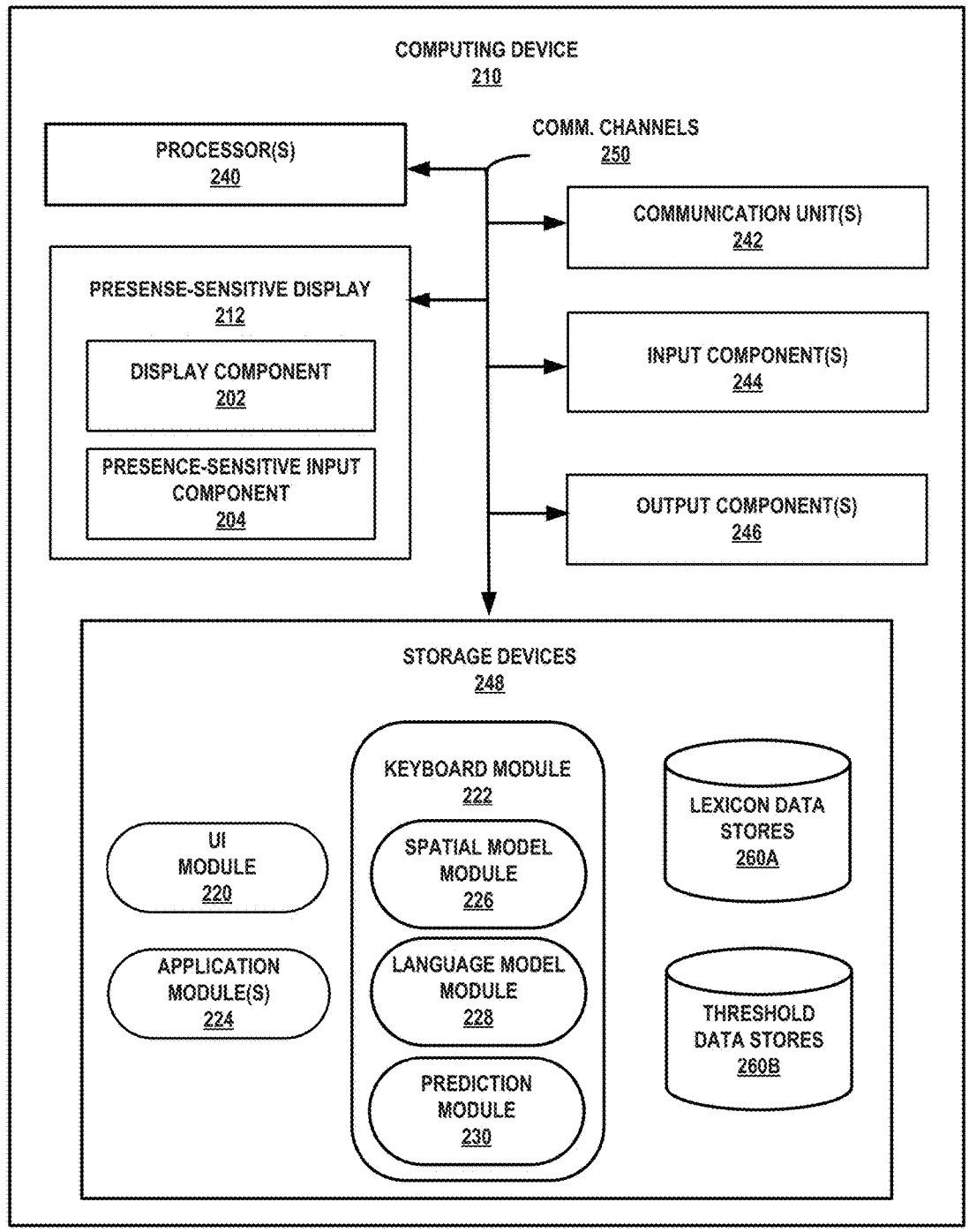
FIG. 2 is a block diagram illustrating an example computing device that is configured to present a graphical keyboard, in accordance with one or more aspects of the present disclosure.

FIG. 2 is a block diagram illustrating an example computing device that is configured to present a graphical keyboard, in accordance with one or more aspects of the present disclosure. Computing device 210 of FIG. 2 is described below as an example of computing device 110 illustrated in FIG. 1. FIG. 2 illustrates only one particular example of computing device 110, and many other examples of computing device 210 may be used in other instances and may include a subset of the components included in example computing device 210 or may include additional components not shown in FIG. 2.

As shown in the example of FIG. 2, computing device 110 includes PSD 212, one or more processors 240, one or more communication units 242, one or more input components 244, one or more output components 246, and one or more storage components 248. Presence-sensitive display 212 includes display component 202 and presence-sensitive input component 204. Storage components 248 of computing device 210 may include UI module 220, keyboard module 222, and one or more application modules 224. Additionally, storage components 248 are configured to store lexicon data stores 260A and threshold data stores 260B (collectively, "data stores 260"). Keyboard module 122 may include spatial model ("SM") module 226, language model ("LM") module 228, and prediction module 230. Communication channels 250 may interconnect each of the components 212, 240, 242, 244, 246, 248, 220, 222, 224, 226, 228, 230, 260, and 262 for inter-component communications (physically, communicatively, and/or operatively). In some examples, communication channels 250 may include a system bus, a network connection, an inter-process communication data structure, or any other method for communicating data.

One or more communication units 242 of computing device 210 may communicate with external devices via one or more wired and/or wireless networks by transmitting and/or receiving network signals on the one or more networks. Examples of communication units 242 include a network interface card (e.g. such as an Ethernet card), an optical transceiver, a radio frequency transceiver, a GPS receiver, or any other type of device that can send and/or receive information. Other examples of communication units 242 may include short wave radios, cellular data radios, wireless network radios, as well as universal serial bus (USB) controllers.

One or more input components 244 of computing device 210 may receive input. Examples of input are tactile, audio, and video input. Input components 242 of computing device 210, in one example, includes a presence-sensitive input device (e.g., a touch sensitive screen, a PSD), mouse, keyboard, voice responsive system, video camera, microphone or any other type of device for detecting input from a human or machine. In some examples, input components 242 may include one or more sensor components one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., microphone, camera, infrared proximity sensor, hygrometer, and the like). Other sensors may include a heart rate sensor, magnetometer, glucose sensor, hygrometer sensor, olfactory sensor, compass sensor, step counter sensor, to name a few other non-limiting examples.

One or more output components 246 of computing device 110 may generate output. Examples of output are tactile, audio, and video output. Output components 246 of computing device 210, in one example, includes a PSD, sound card, video graphics adapter card, speaker, cathode ray tube (CRT) monitor, liquid crystal display (LCD), or any other type of device for generating output to a human or machine.

PSD 212 of computing device 210 includes display component 202 and presence-sensitive input component 204. Display component 202 may be a screen at which information is displayed by PSD 212 and presence-sensitive input component 204 may detect an object at and/or near display component 202. As one example range, presence-sensitive input component 204 may detect an object, such as a finger or stylus that is within two inches or less of display component 202. Presence-sensitive input component 204 may determine a location (e.g., an [x, y] coordinate) of display component 202 at which the object was detected. In another example range, presence-sensitive input component 204 may detect an object six inches or less from display component 202 and other ranges are also possible. Presence-sensitive input component 204 may determine the location of display component 202 selected by a user's finger using capacitive, inductive, and/or optical recognition techniques. In some examples, presence-sensitive input component 204 also provides output to a user using tactile, audio, or video stimuli as described with respect to display component 202. In the example of FIG. 2, PSD 212 may present a user interface (such as graphical user interface 114A for receiving text input and outputting a character sequence inferred from the text input as shown in FIG. 1).

While illustrated as an internal component of computing device 210, PSD 212 may also represent and an external component that shares a data path with computing device 210 for transmitting and/or receiving input and output. For instance, in one example, PSD 212 represents a built-in component of computing device 210 located within and physically connected to the external packaging of computing device 210 (e.g., a screen on a mobile phone). In another example, PSD 212 represents an external component of computing device 210 located outside and physically separated from the packaging or housing of computing device 210 (e.g., a monitor, a projector, etc. that shares a wired and/or wireless data path with computing device 210).

PSD 212 of computing device 210 may receive tactile input from a user of computing device 210. PSD 212 may receive indications of the tactile input by detecting one or more tap or non-tap gestures from a user of computing device 210 (e.g., the user touching or pointing to one or more locations of PSD 212 with a finger or a stylus pen). PSD 212 may present output to a user. PSD 212 may present the output as a graphical user interface (e.g., graphical user interfaces 114 of FIG. 1), which may be associated with functionality provided by various functionality of computing device 210. For example, PSD 212 may present various user interfaces of components of a computing platform, operating system, applications, or services executing at or accessible by computing device 210 (e.g., an electronic message application, a navigation application, an Internet browser application, a mobile operating system, etc.). A user may interact with a respective user interface to cause computing device 210 to perform operations relating to one or more the various functions. For example, keyboard module 222 may cause PSD 212 to present a graphical user interface associated with a text input function of computing device 210. The user of computing device 210 may view output presented as feedback associated with the text input function and provide input to PSD 212 to compose text using the text input function.

PSD 212 of computing device 210 may detect two-dimensional and/or three-dimensional gestures as input from a user of computing device 210. For instance, a sensor of PSD 212 may detect a user's movement (e.g., moving a hand, an arm, a pen, a stylus, etc.) within a threshold distance of the sensor of PSD 212. PSD 212 may determine a two or three dimensional vector representation of the movement and correlate the vector representation to a gesture input (e.g., a hand-wave, a pinch, a clap, a pen stroke, etc.) that has multiple dimensions. In other words, PSD 212 can detect a multi-dimension gesture without requiring the user to gesture at or near a screen or surface at which PSD 212 outputs information for display. Instead, PSD 212 can detect a multi-dimensional gesture performed at or near a sensor which may or may not be located near the screen or surface at which PSD 212 outputs information for display.

One or more processors 240 may implement functionality and/or execute instructions associated with computing device 210. Examples of processors 240 include application processors, display controllers, auxiliary processors, one or more sensor hubs, and any other hardware configure to function as a processor, a processing unit, or a processing device. Modules 220, 222, 224, 226, 228, and 230 may be operable by processors 240 to perform various actions, operations, or functions of computing device 210. For example, processors 240 of computing device 210 may retrieve and execute instructions stored by storage components 248 that cause processors 240 to perform the operations modules 220, 222, 224, 226, 228, and 230. The instructions, when executed by processors 240, may cause computing device 210 to store information within storage components 248.

One or more storage components 248 within computing device 210 may store information for processing during operation of computing device 210 (e.g., computing device 210 may store data accessed by modules 220, 222, 224, 226, 228, and 230 during execution at computing device 210). In some examples, storage component 248 is a temporary memory, meaning that a primary purpose of storage component 248 is not long-term storage. Storage components 248 on computing device 210 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with modules 220, 222, 224, 226, 228, and 230, as well as data stores 260. Storage components 248 may include a memory configured to store data or other information associated with modules 220, 222, 224, 226, 228, and 230, as well as data stores 260.

UI module 220 may include all functionality of UI module 120 of computing device 110 of FIG. 1 and may perform similar operations as UI module 120 for managing a user interface (e.g., user interface 114A and user interface 114B) that computing device 210 provides at presence-sensitive display 212 for handling input from a user. For example, UI module 220 of computing device 210 may query keyboard module 222 for a keyboard layout (e.g., an English language QWERTY keyboard, etc.). UI module 220 may transmit a request for a keyboard layout over communication channels 250 to keyboard module 222. Keyboard module 222 may receive the request and reply to UI module 220 with data associated with the keyboard layout. UI module 220 may receive the keyboard layout data over communication channels 250 and use the data to generate a user interface. UI module 220 may transmit a display command and data over communication channels 250 to cause PSD 212 to present the user interface at PSD 212. In some examples, UI module 220 may detect one or more user inputs at PSD 212 and may output information about the user inputs to keyboard module 222. For example, UI module 220 may detect an initial user input selecting one or more keys of the plurality of keys of the graphical keyboard. Responsive to detecting the initial selection of one or more keys, UI module 220 may generate one or more touch events based on the initial selection of the one or more keys, and may output the one or more touch events to keyboard module 222.

Application modules 224 represent all the various individual applications and services executing at and accessible from computing device 210. A user of computing device 210 may interact with an interface (e.g., a graphical user interface) associated with one or more application modules 224 to cause computing device 210 to perform a function. Numerous examples of application modules 224 may exist and include, a fitness application, a calendar application, a personal assistant or prediction engine, a search application, a map or navigation application, a transportation service application (e.g., a bus or train tracking application), a social media application, a game application, an e-mail application, a messaging application, an Internet browser application, or any and all other applications that may execute at computing device 210.

Keyboard module 222 may include all functionality of keyboard module 122 of computing device 110 of FIG. 1 and may perform similar operations as keyboard module 122 for managing a user interface that computing device 210 provides at presence-sensitive display 212 for handling textual input from a user. Keyboard module 222 may include various submodules, such as SM module 226, LM module 228, and prediction module 230, which may perform the functionality of keyboard module 222.

SM module 226 may receive one or more touch events as input, and output a character or sequence of characters that likely represents the one or more touch events, along with a degree of certainty or spatial model score indicative of how likely or with what accuracy the one or more characters define the touch events. In other words, SM module 226 may infer touch events as a selection of one or more keys of a keyboard and may output, based on the selection of the one or more keys, a character or sequence of characters.

LM module 228 may receive a character or sequence of characters as input from SM module 226, and may output one or more candidate words as character sequences that LM module 228 identifies from lexicon data stores 260A as being potential replacements for the sequence of characters in a language context (e.g., a sentence in a written language). For example, LM module 228 may assign a language model probability to one or more candidate words located at lexicon data store 260A that include at least some of the same characters as the inputted character or sequence of characters. The language model probability assigned to each of the one or more candidate words indicates a degree of certainty or a degree of likelihood that the candidate word is typically found positioned subsequent to, prior to, and/or within, a sequence of words (e.g., a sentence) generated from text input detected by presence-sensitive input component 204 prior to and/or subsequent to receiving the current sequence of characters being analyzed by LM module 228.

Lexicon data stores 260A may include one or more sorted databases (e.g., hash tables, linked lists, sorted arrays, graphs, etc.) that represent dictionaries for one or more written languages. Each dictionary may include a list of words and word combinations within a written language vocabulary (e.g., including grammars, slang, and colloquial word use). LM module 228 of keyboard module 222 may perform a lookup in lexicon data stores 260A for a sequence of characters by comparing the portions of the sequence to each of the words in lexicon data stores 260A. LM module 228 may assign a similarity coefficient (e.g., a Jaccard similarity coefficient) to each word in lexicon data stores 260A based on the comparison and determine one or more candidate words from lexicon data store 260A with a greatest similarity coefficient. In other words, the one or more candidate words with the greatest similarity coefficient may represent the potential words in lexicon data stores 260A that have spellings that most closely correlate to the spelling of the sequence of characters. LM module 228 may determine one or more candidate words that include parts or all of the characters of the sequence of characters and determine that the one or more candidate words with the highest similarity coefficients represent potential corrected spellings of the sequence of characters. In some examples, the candidate word with the highest similarity coefficient matches a sequence of characters generated from a sequence of touch events. For example, the candidate words for the sequence of characters h-i-t-h-e-r-e may include "hi", "hit", "here", "hi there", and "hit here". In response to determining the one or more candidate words, LM module 228 may output the one or more candidate words from lexicon data stores 260A that have the highest similarity coefficients.

Prediction module 230 may determine a probability that one or more keys will be selected after an initial selection of one or more keys based at least in part on the one or more candidate words determined by LM module 228. For example, prediction module 230 may determine a set of characters within the one or more candidate words that come after the character associated with the initial key. In other words, in some examples, if the initial key is the "Z" key, prediction module 230 may determine which letters within the one or more candidate words determined by LM module 228 follow the letter "z". In some examples, if SM module selects the "Z" key as the initial key and LM module determines one or more candidate words that include the letter "z", prediction module 230 may determine the probability that a particular key (e.g., the "W" key) will be selected after the initial key and the probability that a key adjacent to the particular key (e.g., the "E" key) will be selected after the initial key. For example, prediction module 230 may determine the probability that the "W" key will be selected after the "Z" key based on the number (or percentage) of words within the candidate words determined by LM module 228 that include the sequence of letters "zw". For instance, if less than 1% of the candidate words determined by LM module 228 have a spelling that includes (e.g., begins with, ends with, or otherwise includes) a sequence of letters "zw", prediction module 230 may determine the probability that the "W" key will be selected is less than 1%. Similarly, if 30% of the candidate words have a spelling that includes (e.g., begins with, ends with, or otherwise includes) a sequence of letters "ze", prediction module 230 may determine the probability that the "E" key will be selected is 30%. Responsive to determining the respective probabilities that the one or more keys will be selected, prediction module 230 may compare the respective probabilities of the one or more keys to a probability threshold stored at threshold data stores 260B.

Threshold data stores 260B may include one or more temporal thresholds, distance or spatial based thresholds, probability thresholds, or other values of comparison that keyboard module 222 uses to infer characters from text input. The thresholds stored at threshold data stores 260B may be variable thresholds (e.g., based on a function or lookup table) or fixed values. For example, threshold data store 260B may include a first probability threshold (e.g., 0.5%) and a second probability threshold (e.g., 10%). In some examples, the thresholds stored at threshold data stores 260B may be variable thresholds and may dynamically change over-time. For example, based on previous inputs, keyboard module 222 may intelligently learn (e.g., using a machine learning system) characteristics of typical input from a user, and modify the thresholds stored at threshold data stores 260B according to the learned characteristics of a user. For example, keyboard module 222 may determine the thresholds stored at data store 260B based on the keys a user typically selects after selecting an initial key.

Prediction module 230 may determine whether a particular key (e.g., the "W" key) is likely to be selected after a selection of an initial key (e.g., the "Z" key) or whether the area of the graphical keyboard associated with the particular key should be designated as an additional portion of the graphical keyboard for selecting a key adjacent to the particular key (e.g., the "E" key). In some examples, prediction module 230 may make the determination by comparing the probability that a particular key will be selected after an initial key to a single probability threshold. As discussed above, prediction module 230 may determine the probability that a given key will be selected based on the one or more candidate words determined by LM module 228. In some examples, if the probability that the "W" key will be selected after the "Z" key does not satisfy a first probability threshold (e.g., the probability is not greater than 0.0%), prediction module 230 may determine that the "W" key is not likely be to selected after the initial key and that the area of the graphical keyboard associated with the "W" key should be designated as an additional portion of the graphical keyboard for selecting an adjacent key. In such an example, prediction module 230 may determine that the area of the graphical keyboard associated with the "W" key should be designated as an additional portion of the graphical keyboard for selecting the adjacent key with the highest probability of being selected (e.g., in a QWERTY keyboard, the "E" key may be the adjacent key with the highest probability of being selected after the "Z" key). In other words, when SM module 226 analyzes touch events associated with a subsequent input at or near a location of PSD 212 at which the "W" is displayed, prediction module 230 may cause SM module 226 to map the subsequent input to the "E" key rather than the "W" key, which may cause SM module 226 to select the "E" rather than the "W" key. Prediction module 230 may output a message to UI module 220 indicating that SM module 226 will map a user input at the "W" key to the "E" key.

In some examples, prediction module 230 may make the determination by comparing the probability that a particular key will be selected to a first probability threshold and by comparing the probability that an adjacent key will be selected to a second probability threshold. For example, if the probability that the particular key will be selected after the initial key does not satisfy a first probability threshold (e.g., the probability is not greater than 1.0%) and the probability that an adjacent key will be selected after the initial key satisfies a second probability threshold (e.g., the probability is greater than 10%), prediction module 230 may output an indication designating the area of the graphical keyboard associated with the particular key as being an additional portion of the graphical keyboard for selecting the adjacent key. For instance, if the first probability threshold equals 1.0%, the second probability threshold equals 10.0%, the probability that the "W" key will be selected equals 0.5%, and the probability that the "E" key will be selected equals 15.0%, prediction module 230 may designate the area of the graphical keyboard associated with the "W" key as being an additional portion of the graphical keyboard for selecting the "E" key. In other words, when SM module 226 analyzes touch events associated with a subsequent input at or near a location of PSD 212 at which the "W" is displayed, prediction module 230 may cause SM module 226 to select the "E" key rather than the "W" key. In some examples, prediction module 230 may output a message to UI module 220 designating the area of the graphical keyboard associated with the "W" key as being an additional portion of the graphical keyboard for selecting the "E" key. In other words, prediction module 230 may output a message to UI module 220 indicating that SM module 226 will map a user input at the "W" key to the "E" key.

In some examples, prediction module 230 may determine that the probability that a particular key will be selected after an initial key does not satisfy the probability threshold, and that the probability that a first adjacent key will be selected does satisfy the probability threshold and that the probability that a second adjacent key will be selected also satisfies the probability threshold. For example, prediction module 230 may determine the probability that the "W" key will be selected after the "Z" key is not greater than the probability threshold (e.g., 1%) and that the probability that the "A" key will be selected and the probability that the "E" key will be selected are both greater than the probability threshold. In some examples, prediction module 230 may determine whether the area of the graphical keyboard associated with the "W" key should be designated as an additional portion of the graphical keyboard for selecting the "A" key or the "E" key. In some examples, prediction module 230 may determine to designate the area of the graphical keyboard associated with the "W" key as being an additional portion of the graphical keyboard for selecting the adjacent key with the highest probability of being selected after the initial "Z" key. For example, if the probability that the "A" key will be selected equals 20% and the probability that the "E" key will be selected equals 22%, prediction module 230 may designate the area of the graphical keyboard associated with the "W" key as being an additional portion of the graphical keyboard for selecting the "E" key. In other words, prediction module 230 may cause SM module 226 to select the "E" key rather than the "W" key or the "A" key if a subsequent user input is received at or near a location of PSD 212 corresponding to the "W" key.

Responsive to receiving the message from prediction module 230, UI module 220 may output an updated graphical keyboard that includes a graphical indication designating the area of the graphical keyboard associated with the particular key as being an additional portion of the graphical keyboard for selecting the adjacent key. As described above with reference to FIG. 1, the graphical indication may also include changing a display color associated with the particular key, the adjacent key, or both. As also described with reference to FIG. 1, the graphical indication may include outputting a single key at the same region of PSD 112 at which the particular key and the adjacent key were previously displayed. Outputting a single key may include removing a visual break between the particular "W" key and the adjacent "E" key, for example, by removing a line or border between the two keys. Outputting a single key may include outputting a combined border around one or more keys. In some examples, outputting a single key may include displaying all of the characters associated with the single key (e.g., displaying the letters "w" and "e"). However, in other examples, outputting a single key may include displaying the character associated with the adjacent key and refraining from displaying the character associated with the particular key. In other words, PSD 212 may display the letter "e" within the single key but may refrain from displaying the letter "w" within the single key.

In some examples, prediction module 230 may output a message to UI module 220 designating a portion of an area of the graphical keyboard associated with particular key as being an additional portion of the graphical keyboard for selecting an adjacent key. For example, prediction module 230 may determine the probability that a particular key (e.g., the "W" key) will be selected after an initial key (e.g., the "Z" key) does not satisfy a probability threshold but that the respective probabilities that two adjacent keys (e.g., the "E" key and the "A" key) will be selected do satisfy the probability threshold, and may designate a first portion of the area of the graphical keyboard associated with the "W" key as being an additional portion of the graphical keyboard for selecting the "E" key and a second portion of the area of the graphical keyboard associated with the "W" key as being an additional portion of the graphical keyboard for selecting the "A" key. In some examples, prediction module 230 may output a message to UI module 220 designating an area of the graphical keyboard associated with a particular key (or portion of the particular key) as being an additional portion of the graphical keyboard for selecting a key that is not adjacent to the particular key. For example, prediction module 230 may determine that the respective probabilities that the "Q" key and the "W" key will be selected after the "Z" key do not satisfy a probability threshold, and may designate both the area of the graphical keyboard associated with the "Q" key and the "W" key as being additional portions of the graphical keyboard for selecting the "E" key (where the "Q" key is not adjacent to the "E" key in a standard QWERTY keyboard).

Figure 3:
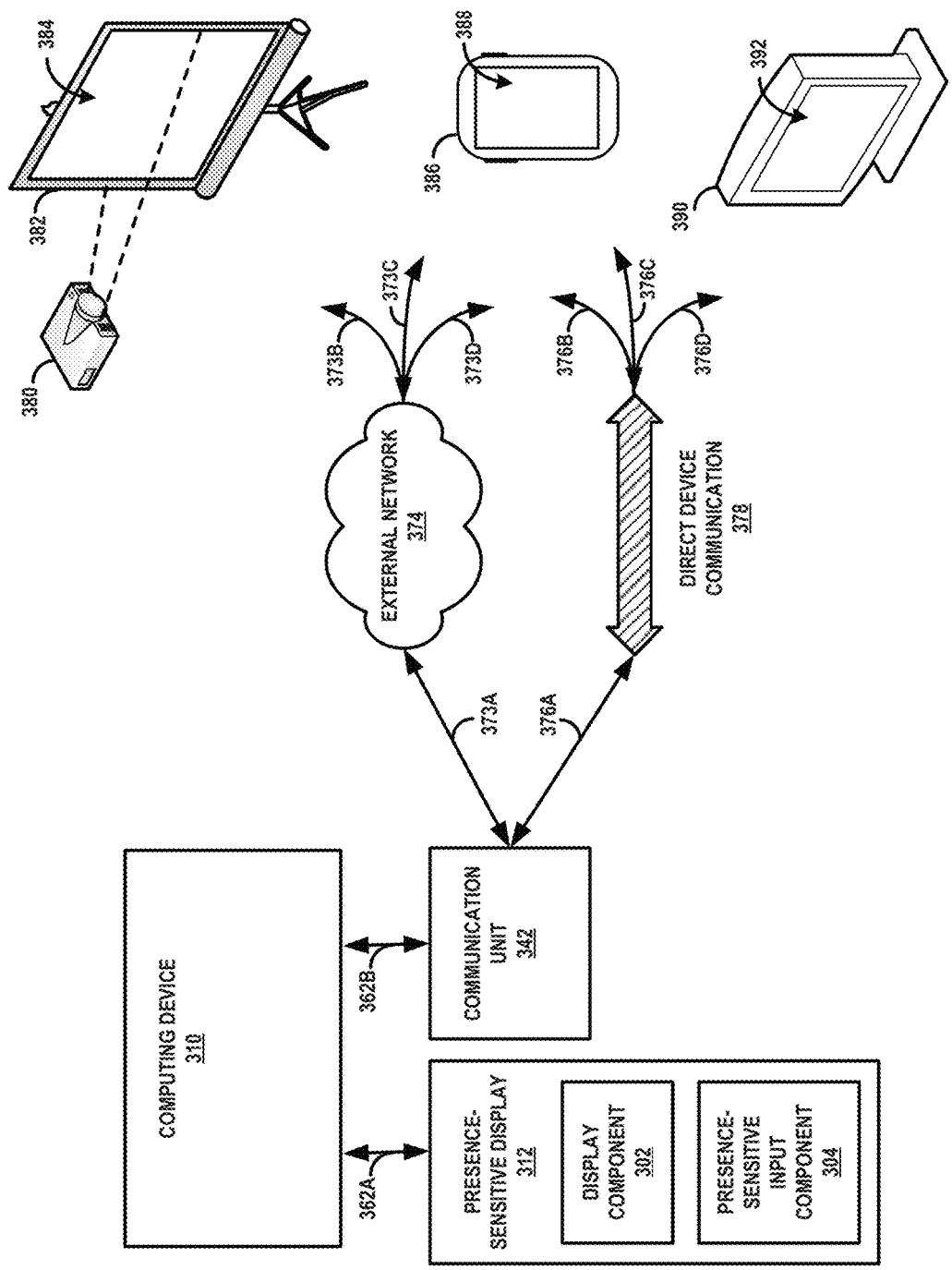
FIG. 3 is a block diagram illustrating an example computing device that outputs graphical content for display at a remote device, in accordance with one or more techniques of the present disclosure.

FIG. 3 is a block diagram illustrating an example computing device that outputs graphical content for display at a remote device, in accordance with one or more techniques of the present disclosure. Graphical content, generally, may include any visual information that may be output for display, such as text, images, and a group of moving images, to name only a few examples. The example shown in FIG. 3 includes a computing device 310, a PSD 312, communication unit 342, projector 380, projector screen 382, mobile device 386, and visual display component 390. In some examples, PSD 312 may be a presence-sensitive display as described in FIGS. 1-2. Although shown for purposes of example in FIGS. 1 and 2 as a stand-alone computing device 110 and 210 respectively, a computing device such as computing device 310 may, generally, be any component or system that includes a processor or other suitable computing environment for executing software instructions and, for example, need not include a presence-sensitive display.

As shown in the example of FIG. 3, computing device 310 may be a processor that includes functionality as described with respect to processors 240 in FIG. 2. In such examples, computing device 310 may be operatively coupled to PSD 312 by a communication channel 362A, which may be a system bus or other suitable connection. Computing device 310 may also be operatively coupled to communication unit 342, further described below, by a communication channel 362B, which may also be a system bus or other suitable connection. Although shown separately as an example in FIG. 3, computing device 310 may be operatively coupled to PSD 312 and communication unit 342 by any number of one or more communication channels.

In other examples, such as illustrated previously by computing devices 110 and 210 in FIGS. 1-2 respectively, a computing device may refer to a portable or mobile device such as mobile phones (including smart phones), laptop computers, etc. In some examples, a computing device may be a desktop computer, tablet computer, smart television platform, camera, personal digital assistant (PDA), server, or mainframes.

PSD 312 may include display component 302 and presence-sensitive input component 304. Display component 302 may, for example, receive data from computing device 310 and display the graphical content. In some examples, presence-sensitive input component 304 may determine one or more user inputs (e.g., continuous gestures, multi-touch gestures, single-touch gestures) at PSD 312 using capacitive, inductive, and/or optical recognition techniques and send indications of such user input to computing device 310 using communication channel 362A. In some examples, presence-sensitive input component 304 may be physically positioned on top of display component 302 such that, when a user positions an input unit over a graphical element displayed by display component 302, the location at which presence-sensitive input component 304 corresponds to the location of display component 302 at which the graphical element is displayed.

As shown in FIG. 3, computing device 310 may also include and/or be operatively coupled with communication unit 342. Communication unit 342 may include functionality of communication unit 242 as described in FIG. 2. Examples of communication unit 342 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 310 may also include and/or be operatively coupled with one or more other devices (e.g., input devices, output components, memory, storage devices) that are not shown in FIG. 3 for purposes of brevity and illustration.

FIG. 3 also illustrates a projector 380 and projector screen 382. Other such examples of projection devices may include electronic whiteboards, holographic display components, and any other suitable devices for displaying graphical content. Projector 380 and projector screen 382 may include one or more communication units that enable the respective devices to communicate with computing device 310. In some examples, the one or more communication units may enable communication between projector 380 and projector screen 382. Projector 380 may receive data from computing device 310 that includes graphical content. Projector 380, in response to receiving the data, may project the graphical content onto projector screen 382. In some examples, projector 380 may determine one or more user inputs (e.g., continuous gestures, multi-touch gestures, single-touch gestures) at projector screen using optical recognition or other suitable techniques and send indications of such user input using one or more communication units to computing device 310. In such examples, projector screen 382 may be unnecessary, and projector 380 may project graphical content on any suitable medium and detect one or more user inputs using optical recognition or other such suitable techniques.

Projector screen 382, in some examples, may include a presence-sensitive display 384. Presence-sensitive display 384 may include a subset of functionality or all of the functionality of presence-sensitive display 112, 212, and/or 312 as described in this disclosure. In some examples, presence-sensitive display 384 may include additional functionality. Projector screen 382 (e.g., an electronic whiteboard), may receive data from computing device 310 and display the graphical content. In some examples, presence-sensitive display 384 may determine one or more user inputs (e.g., continuous gestures, multi-touch gestures, single-touch gestures) at projector screen 382 using capacitive, inductive, and/or optical recognition techniques and send indications of such user input using one or more communication units to computing device 310.

FIG. 3 also illustrates mobile device 386 and visual display component 390. Mobile device 386 and visual display component 390 may each include computing and connectivity capabilities. Examples of mobile device 386 may include e-reader devices, convertible notebook devices, hybrid slate devices, etc. Examples of visual display component 390 may include other semi-stationary devices such as televisions, computer monitors, etc. As shown in FIG. 3, mobile device 386 may include a presence-sensitive display 388. Visual display component 390 may include a presence-sensitive display 392. Presence-sensitive displays 388, 392 may include a subset of functionality or all of the functionality of presence-sensitive display 112, 212, and/or 312 as described in this disclosure. In some examples, presence-sensitive displays 388, 392 may include additional functionality. In any case, presence-sensitive display 392, for example, may receive data from computing device 310 and display the graphical content. In some examples, presence-sensitive display 392 may determine one or more user inputs (e.g., continuous gestures, multi-touch gestures, single-touch gestures) at projector screen using capacitive, inductive, and/or optical recognition techniques and send indications of such user input using one or more communication units to computing device 310.

As described above, in some examples, computing device 310 may output graphical content for display at PSD 312 that is coupled to computing device 310 by a system bus or other suitable communication channel. Computing device 310 may also output graphical content for display at one or more remote devices, such as projector 380, projector screen 382, mobile device 386, and visual display component 390. For instance, computing device 310 may execute one or more instructions to generate and/or modify graphical content in accordance with techniques of the present disclosure. Computing device 310 may output the data that includes the graphical content to a communication unit of computing device 310, such as communication unit 342. Communication unit 342 may send the data to one or more of the remote devices, such as projector 380, projector screen 382, mobile device 386, and/or visual display component 390. In this way, computing device 310 may output the graphical content for display at one or more of the remote devices. In some examples, one or more of the remote devices may output the graphical content at a presence-sensitive display that is included in and/or operatively coupled to the respective remote devices.

In some examples, computing device 310 may not output graphical content at PSD 312 that is operatively coupled to computing device 310. In other examples, computing device 310 may output graphical content for display at both a PSD 312 that is coupled to computing device 310 by communication channel 362A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 310 and output for display at PSD 312 may be different than graphical content display output for display at one or more remote devices.

Computing device 310 may send and receive data using any suitable communication techniques. For example, computing device 310 may be operatively coupled to external network 374 using network link 373A. Each of the remote devices illustrated in FIG. 3 may be operatively coupled to network external network 374 by one of respective network links 373B, 373C, or 373D. External network 374 may include network hubs, network switches, network routers, etc., that are operatively inter-coupled thereby providing for the exchange of information between computing device 310 and the remote devices illustrated in FIG. 3. In some examples, network links 373A-373D may be Ethernet, ATM or other network connections. Such connections may be wireless and/or wired connections.

In some examples, computing device 310 may be operatively coupled to one or more of the remote devices included in FIG. 3 using direct device communication 378. Direct device communication 378 may include communications through which computing device 310 sends and receives data directly with a remote device, using wired or wireless communication. That is, in some examples of direct device communication 378, data sent by computing device 310 may not be forwarded by one or more additional devices before being received at the remote device, and vice-versa. Examples of direct device communication 378 may include Bluetooth, Near-Field Communication, Universal Serial Bus, WiFi, infrared, etc. One or more of the remote devices illustrated in FIG. 3 may be operatively coupled with computing device 310 by communication links 376A-376D. In some examples, communication links 376A-376D may be connections using Bluetooth, Near-Field Communication, Universal Serial Bus, infrared, etc. Such connections may be wireless and/or wired connections.

In accordance with techniques of the disclosure, computing device 310 may be operatively coupled to visual display component 390 using external network 374. Computing device 310 may output a graphical keyboard for display at PSD 312. For instance, computing device 310 may send data that includes a representation of the graphical keyboard to communication unit 342. Communication unit 342 may send the data that includes the representation of the graphical keyboard to visual display component 390 using external network 374. Visual display component 390, in response to receiving the data using external network 374, may cause PSD 312 to output the graphical keyboard. In response to receiving a user input at PSD 312 to select one or more keys of the keyboard, visual display component 390 may send an indication of the user input to computing device 310 using external network 374. Communication unit 342 may receive the indication of the user input, and send the indication to computing device 310.

Computing device 310 may select, based on the user input, one or more keys. Computing device 310 may determine, based on the initial selection of one or more keys, one or more candidate words. In some examples, computing device 310 may determine, based at least in part on the one or more candidate words, a probability that a particular key will be selected after the initial selection of one or more keys. Responsive to determining that the probability does not satisfy a probability threshold, computing device 310 may output a representation of an updated graphical user interface including an updated graphical keyboard. The updated graphical keyboard may include a graphical indication designating the area of the graphical keyboard associated with the particular key as being an additional portion of the graphical keyboard for selecting a character associated with an adjacent key. Communication unit 342 may receive the representation of the updated graphical user interface and may send the representation to visual display component 390, such that visual display component 390 may cause PSD 312 to output the updated graphical keyboard, including the graphical indication designating the area of the graphical keyboard associated with the particular key as being an additional portion of the graphical keyboard for selecting the adjacent key.

FIGS. 4A-4E are conceptual diagrams illustrating example graphical user interfaces of an example computing device that is configured to present example graphical keyboards, in accordance with one or more aspects of the present disclosure. FIGS. 4A-4E illustrate, respectively, example graphical user interfaces 414A-414E (collectively, user interfaces 414). However, many other examples of graphical user interfaces may be used in other instances. Each of graphical user interfaces 414 may correspond to a graphical user interface output by computing devices 110, 210 of FIGS. 1 and 2 respectively. FIGS. 4A-4E are described below in the context of computing devices 110, 210 of FIGS. 1 and 2.

As illustrated in the examples of FIGS. 4A-4E, each example graphical user interface 414 includes edit region 416A, graphical keyboard 416B, and suggested word region 416C. Edit region 416A may include graphical elements such as images, objects, hyperlinks, characters of text, etc. Graphical keyboard 416B includes graphical elements displayed as keys. Suggested word region 416C includes suggested words 438A-438C (collectively "suggested words" 438) which may represent selectable spelling corrections and/or selectable word suggestions to replace character strings that are included in edit region 416A. In the example of FIG. 4A, edit region 416A includes graphical elements displayed as characters of text (e.g., a word). A user of computing device 210 may enter text in edit region 416A by providing user input at locations of PSD 212 that display the keys of graphical keyboard 416B. In response to receiving a user input, computing device 210 may output one or more suggested words 438 in suggested word region 416C.

Figure 4B:
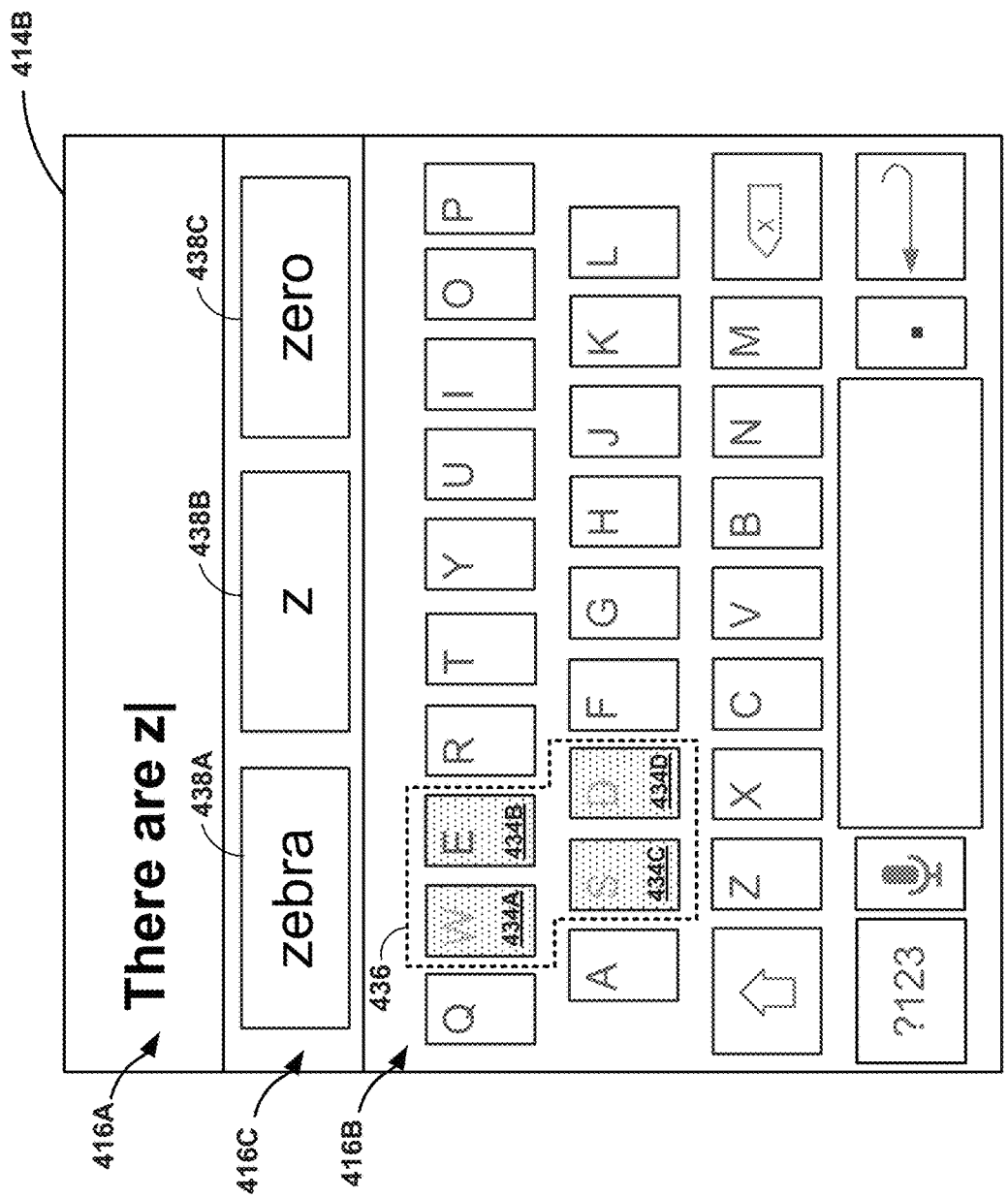

As illustrated in FIG. 4A, UI module 220 may detect an initial user input at location 432A and may output a touch event based on the detected input. SM module 226 of keyboard module 222 may receive the touch event generated by UI module 220 and may select an initial key based on the touch event. For example, UI module 220 may determine that the user input corresponds to the "Z" key of graphical keyboard 416B, select the "Z" key, and output an indication of the selected key. UI module 220 may receive the indication of the selected key and may update the user interface based on the selection of the "Z" key. For example, as illustrated in FIG. 4B, UI module 220 may update edit region 416A of user interface 414B to include the letter "z", such that edit region 416A of user interface 414B includes that phrase "There are z".

Responsive to the receiving an indication of the selected key, LM module 228 may determine, based on the initial selection of the "Z" key, one or more candidate words. In some examples, LM module 228 may identify one or more candidate words by determining words within lexicon data stores 260A that begin with, or include, the letter "z", such as the words "Aztec", "zoo", "zero", "zebra", and "Zach". LM module 228 may assign a probability to each of the candidate words and may determine at least one of the one or more candidate words that are likely to be selected by a user. In some examples, LM module 228 may select, as suggested words, the candidate words with the highest probability of being selected by the user. For example, LM module 228 may determine that the words "zebra" and "zero" are the words most likely to be selected by a user, select the words to be the suggested words, and output an indication of each suggested word.

Prediction module 230 may determine, based on the one or more candidate words, the probability that a particular key will be selected after the initial key. For example, prediction module may determine the probability that key 434A (e.g., the "W" key) will be selected after the "Z" key. For instance, prediction module 230 may determine that very few, if any, of the candidate words determined by LM module 228 have a spelling that includes (e.g., begins with, ends with, or otherwise includes) a sequence of letters "zw". As a result, prediction module 230 may determine the probability that key 434A will be selected is low (e.g., zero percent). In some examples, prediction module 230 may determine the probability that a key adjacent to the particular key will be selected after the initial key. For example, prediction module 230 may determine, based on the one or more candidate words, the probability that key 434B (e.g., the "E" key) will be selected. For instance, prediction module 230 may determine that many of the candidate words begin with the letters "ze". As a result, prediction module 230 may determine the probability that key 434B will be selected is relatively high (e.g., 25%). Similarly, prediction module may determine the probability that keys 434C and 434D will be selected after the "Z" key. For purposes of illustration only, prediction module 230 may determine that, based on the spellings of the candidate words determined by LM module 228, that the respectively probabilities that keys 434A-434D will be selected after the "Z" key 133 are 0.0%, 25.0%, 0.5% and 0.5%, respectively.

Prediction module 230 may compare the probability that key 434A will be selected after the "Z" key to a probability threshold. For example, if the probability threshold equals 1.0% and the probability that key 434A will be selected equals 0.0%, prediction module 230 may determine the probability that key 434A will be selected is less than and therefore does not satisfy the probability threshold of one percent. As a result, prediction module 230 may determine that, if UI module 220 detects a subsequent user input at key 434A, SM module 226 will map the subsequent user input to a key adjacent to key 434A. In other words, when SM module 226 analyzes touch events associated with a subsequent input at or near a location of PSD 212 at which key 434A is displayed, SM module 226 may determine to select a key adjacent to key 434A rather than the actual key 434A. Similarly, prediction module 230 may compare the probability that keys 434C and 434D will be selected to the probability threshold and may determine that the respective probabilities do not satisfy the probability threshold. Thus, prediction module 230 may determine that, if UI module 220 detects a user input at key 434C, SM module 226 will map the user input to a key adjacent to key 434C. Likewise, prediction module 230 may determine that a user input received at key 434D will be mapped to a key adjacent to key 434D.

In some examples, unlike key 434B, prediction module 230 may determine the probability that key 434B will be selected by a subsequent input satisfies the probability threshold. In some examples, because keys 434, 434C, and 434D are all keys with low probabilities of being selected and are adjacent to key 434B which has a probability of being selected that satisfies the probability threshold, prediction module 230 may determine that a subsequent user input received at any of keys 434A, 434C, or 434D will be mapped to key 434B. Thus, as illustrated by dashed border 436, prediction module 230 may determine that the areas of the graphical keyboard associated with keys 434A, 434C, and 434D should be designated as additional portions of the graphical keyboard for selecting key 434B, and may output an indication designating the areas of the graphical keyboard associated with keys 434A, 434C, and 434D as additional portions of the graphical keyboard for selecting key 434B. It is to be understood that dashed border 436 surrounding keys 434A-434D is shown for ease of illustration only and is not necessarily displayed as part of graphical user interface 414B.

UI module 220 may receive the indication the one or more suggested words (e.g., the words "zero" and "zebra") and may update the graphical user interface. For example, UI module 220 output the suggested words as suggested words 438A and 438C. In some examples, suggested word 438B may include a string including the characters actually selected by the user input. For example, as illustrated in FIG. 4B, suggested words 438A-438C include suggested word "zebra", actual string "z", and suggested word "zero", respectively.

UI module 220 may receive the indication designating the areas of the graphical keyboard associated with keys 434A, 434C, and 434D as additional portions of the graphical keyboard for selecting key 434B and may update the graphical user interface accordingly. UI module 220 may output updated graphical user interface 414B that includes an updated graphical keyboard, where the updated graphical keyboard includes a graphical indication designating the areas of the graphical keyboard associated with keys 434A, 434C, and 434D as additional portions of the graphical keyboard for selecting key 434B.

In some examples, UI module 220 may output the graphical indication by changing a display color of the respective characters associated with the particular keys (e.g., keys 434A, 434C, and 434D) designated as additional portions of the graphical keyboard for selecting the adjacent key. In other words, UI module 220 may change the display color of the letters "W", "S", and "D" from a first color to a second color. For instance, as illustrated in FIG. 4B, UI module 220 may change the display colors of the letters "W", "S", and "D" from black to gray (or any other color different from the first color). In some examples, as illustrated in FIG. 4B, UI module 220 may refrain from changing the display color of the character associated with the adjacent key, such that the display color of the characters associated with the respective particular keys is different than the display color of the character associated with the adjacent key. In other words, UI module 220 may change the display color of the letters "W", "S", and "D" but may refrain from changing the display color of the letter "E". In other examples, UI module 220 may change the display color of the character associated with the adjacent key. For example, UI module 220 may change the display color of the letter "E" from black to gray.

In some examples, UI module 220 may output the graphical indication by changing a display color of the particular keys designated as additional portions of the graphical keyboard for selecting the adjacent key. For example, as illustrated by FIG. 4B, UI module 220 may change the display color of the particular keys (e.g., keys 434A, 434C, and 434D) from a first color to a second color. For instance, UI module 220 may change the display color of keys 434A, 434C, and 434D from white to gray (or any other color different from the first color). In some examples, UI module 220 may change the display color of keys 434A, 434C, and 434D by changing the background of the keys from a solid color to a pattern. In some examples, as illustrated in FIG. 4B, UI module 220 may change the display color of the adjacent key from a first color to a second color. For example, UI module 220 may change the display color of key 434B from white to gray. In other examples, UI module 220 may refrain from changing the display color of the adjacent key such that the display color of the respective particular keys is different than the display color of the adjacent key. In other words, UI module 220 may change the display color of keys 434A, 434C, and 434D but may refrain from changing the display color of key 434B.

In some examples, UI module 220 may output the graphical indication by changing a display color of the characters associated with the particular keys (e.g., as illustrated in FIG. 4B, the display colors of the letters "W", "S", and "D" has changed from black to gray), and changing the display color of the particular keys and the adjacent key (e.g., as illustrated in FIG., the color of keys 434A, 434C, and 434D has changed from white to a pattern of dots). In some examples, UI module 220 may output the graphical indicating by changing a display color of the characters associated with the particular keys and the display color of the character associated with the adjacent key, and changing the display color of the adjacent key. In other words, in some examples, UI module 220 may change the display color of the letters "W", "S", "D", and "E" from black to gray and may change the color of the "E" key from white to a pattern while leaving the color of the "W", "S", and "D" keys as unchanged (e.g., white).

Figure 4C:
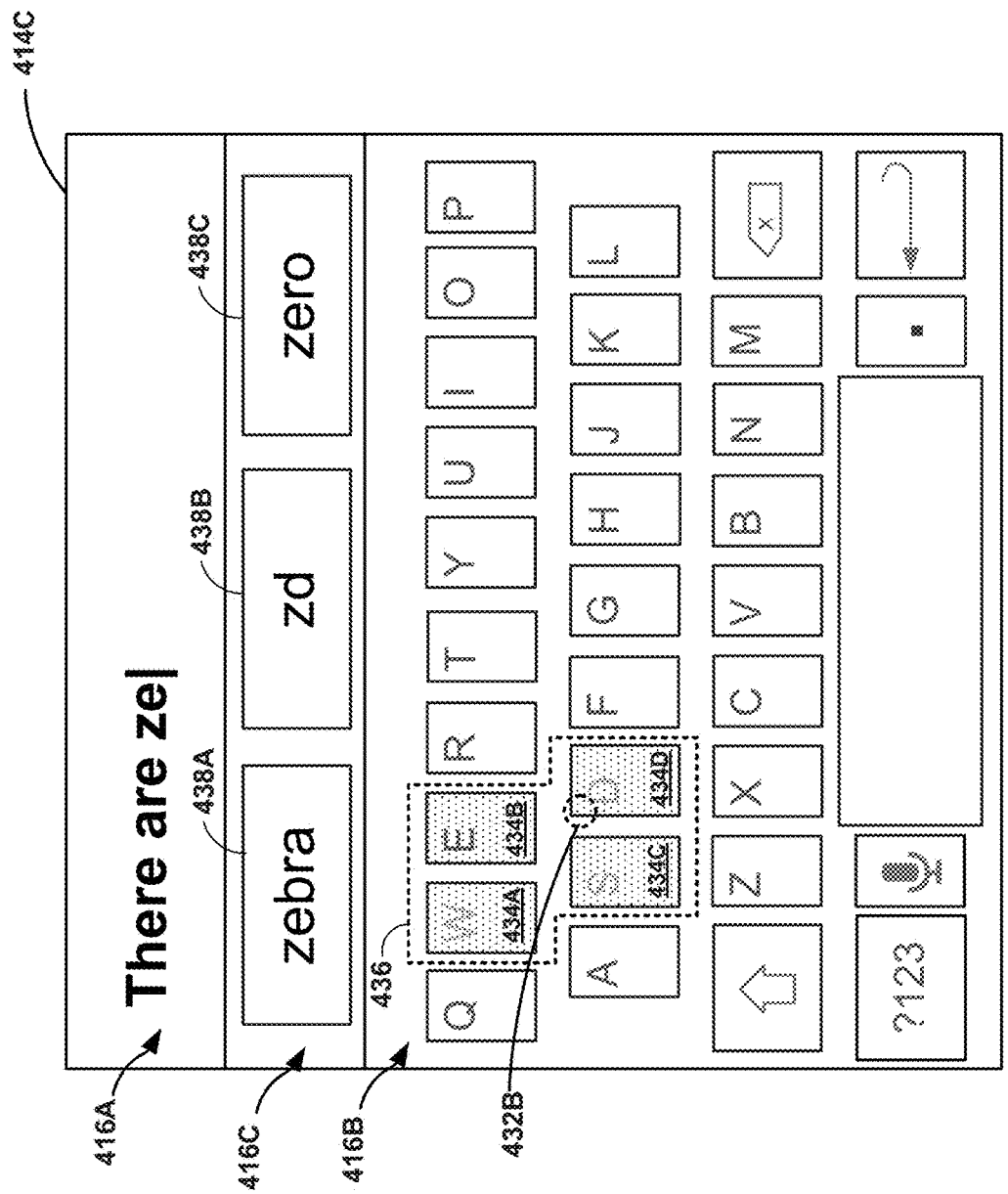

In some examples, UI module 220 may output the updated graphical user interface, including the updated edit region 416A, updated graphical keyboard 416B, and updated suggested word region 416C, and may cause PSD 212 to display the updated graphical user interface 414B as illustrated in FIG. 4B. As illustrated in FIG. 4C, responsive to displaying updated graphical user interface 414B, UI module 220 may detect a second user input at location 432B (e.g., an input that follows the first input detected at location 432A) and may output a touch event associated with the second user input. SM module 226 may determine one or more keys associated with the touch event. For example, SM module 226 may determine that the user input was actually detected at a location of PSD 212 corresponding to key 434D such that the touch event is associated with key 434D. However, because prediction module 230 previously determined that the selection of key 434D is designated as an additional key for selecting adjacent key 434E, SM module 226 may determine that the touch event corresponding to the user input is also associated with adjacent key 434B. As a result, SM module 226 may map the user input to adjacent key 434B. SM module 226 may output an indication of the particular key 434D corresponding to the actual location of the user input and an indication of adjacent, mapped key 434B. UI module 220 may receive the indication of key 434D which corresponds to the actual location of PSD 212 where the user input was received and may output the string of actually selected characters "zd" at suggested word 438B. UI module 220 may also receive the indication of adjacent, mapped key 434B and may output the character associated with adjacent, mapped key 434B in edit region 416A, such that edit region 416A displays the phrase "There are ze".

In some examples, LM module 228 may update the one or more candidate words that prediction module 230 relies on to predict subsequent keys based on the selection of the first and second keys. For example, LM module 228 may determine one or more candidate words based on the selection of the letters "ze", the selection of the letters "zd", or both. LM module 228 may select at least one of the one or more candidate words as suggested words, and may output the suggested words to UI module 220. UI module 220 may output the suggested words at suggested words 438A and 438C.

Figure 4D:
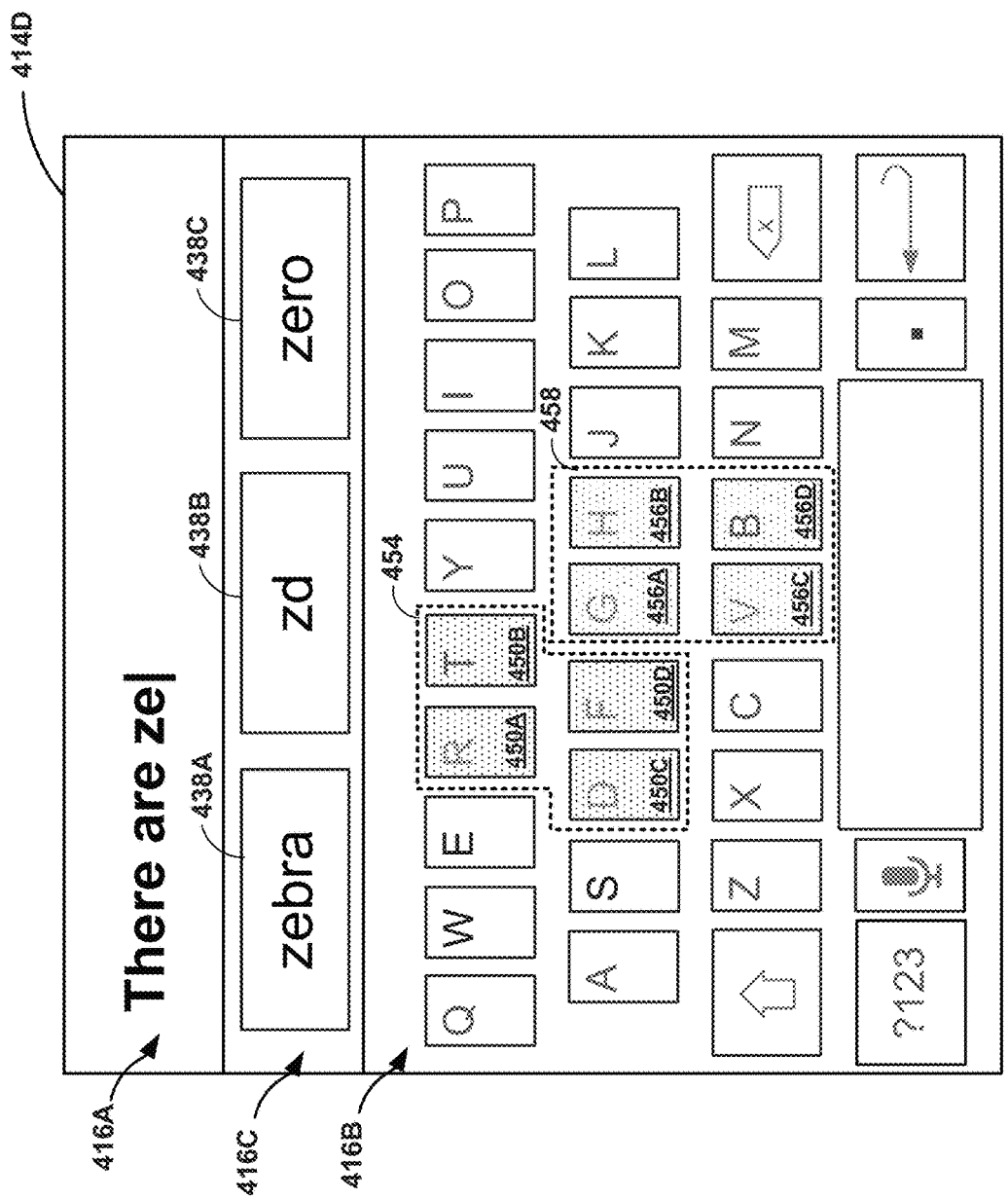

As illustrated in FIG. 4D, prediction module 230 may determine, based at least in part on the one or more candidate words, the respective probabilities that one or more keys will be selected after the first and second keys. For example, prediction module 230 may reset the probabilities associated with each key to a default probability (e.g., zero) or may overwrite the probabilities associated each key to a newly determined probability. Responsive to determining the respective probabilities that one or more keys does not satisfy a probability threshold, prediction module 230 may designate the areas of the graphical keyboard associated with the one or more keys as additional portions of the graphical keyboard for selecting an adjacent key. For example, as illustrated by dashed border 454, if prediction module 230 determines the respective probabilities that keys 450A, 450C, and 450D do not satisfy a probability threshold, prediction module may designate the areas of the graphical keyboard associated with keys 450A, 450C, and 450D as additional portions of the graphical keyboard for selecting key 450B. Similarly, as illustrated by dashed border 456D, if prediction module 230 determines the respective probabilities that keys 456A, 456B, and 456C do not satisfy a probability threshold, prediction module may designate the area of the graphical keyboard associated with keys 456A, 456B, and 456C as additional portions of the graphical keyboard for selecting key 456D. Prediction module 230 may output an indication of the respective designations to UI module 220.

As illustrated in FIG. 4D, UI module 220 may receive the indication of the respective designations from prediction module 230 and may update the graphical user interface 414D to include a graphical indication that the areas of the graphical keyboard associated with keys 450A, 450C, and 450D are designated as additional portions of the graphical keyboard for selecting key 450B and that the areas of the graphical keyboard associated with keys 456A, 456B, and 456C are designated as additional portions of the graphical keyboard for selecting key 456D. As described above, UI module 220 may output the graphical indication by changing a display color associated with the keys (e.g., the display color of the keys or a display color of a respective character associated with the respective keys), changing an element of a font associated with the key (e.g., font type, size, color, or other characteristic of the font).

Figure 4E:
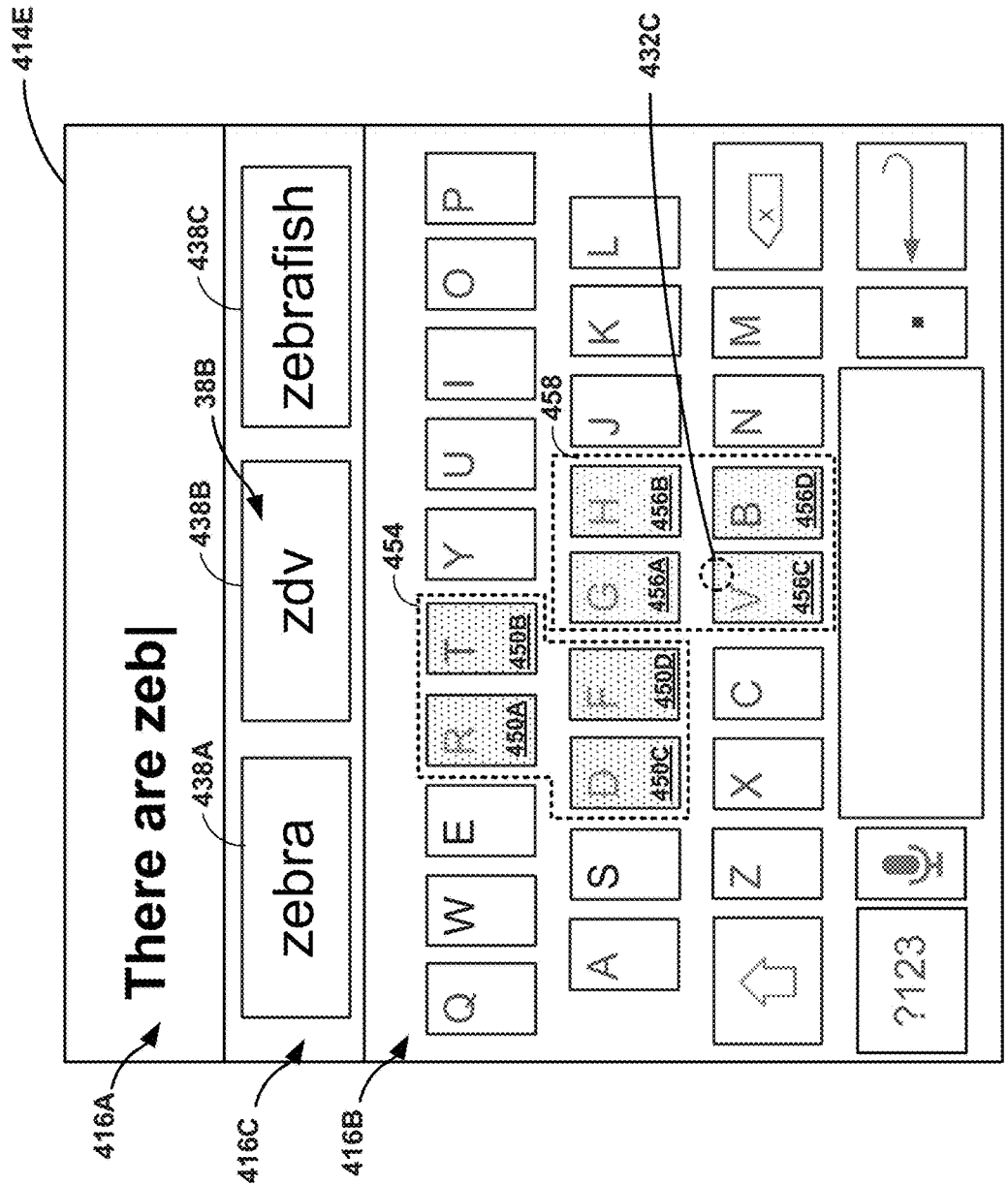

Responsive to outputting an updated graphical user interface, UI module 220 may detect a third user input at location 432C, as illustrated by FIG. 4E. Responsive to detecting a third user input, UI module 220 may output a touch event associated with the third user input. Responsive to receiving the touch event, SM module 226 may determine one or more keys associated with the touch event. For example, SM module 226 may determine that the touch event literally corresponds to key 456C. However, because prediction module 230 previously determined that the selection of key 456C is designated as an additional key for selecting adjacent key 456D, SM module 226 may determine that the touch event also corresponds to key 456D and may map the touch event to key 456D. SM module 226 may output an indication of the actual key 456C and mapped key 456D. UI module 220 may receive the indication of the actual key 456C and may output the string of actually selected characters "zdv" at suggested word 438B. UI module 220 may also receive the indication of the mapped key 456D and may output the mapped character in edit region 416A, such that edit region 416A displays the phrase "There are zeb".

In some examples, LM module 228 may update the one or more candidate words based on the selection of the first and second keys. For example, LM module 228 may determine one or more candidate words based on the selection of the mapped letters "zeb", the selection of the letters "zdv" which were actually displayed at locations of PSD 212 where the user input was received, or both. LM module 228 may select at least one of the one or more candidate words as suggested words (e.g., "zebra" and "zebrafish"), and may output the suggested words to UI module 220. UI module 220 may output the suggested words at suggested words 438A and 438C.

Figure 5:
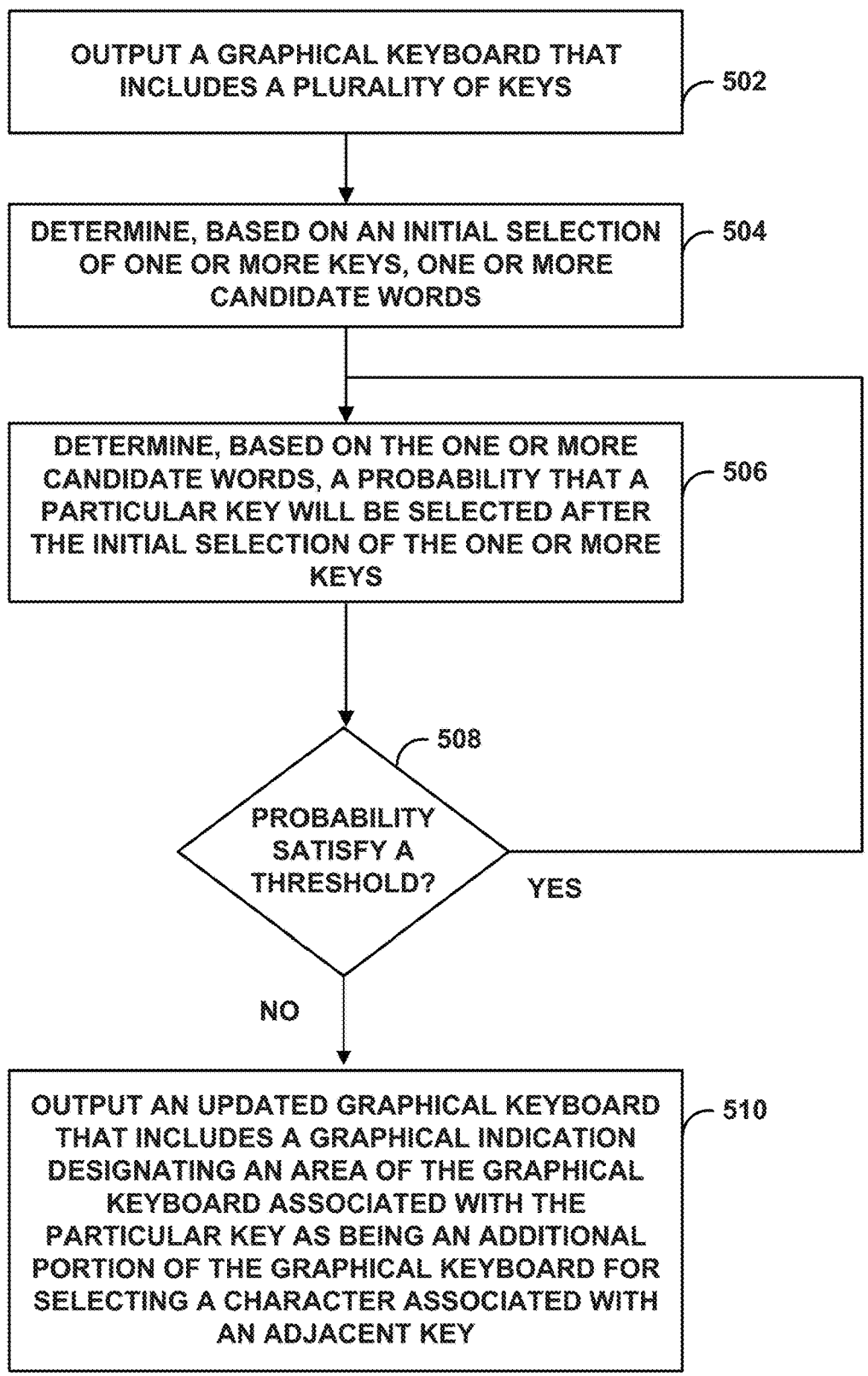
FIG. 5 is a flowchart illustrating example operations of a computing device that is configured to present a graphical keyboard, in accordance with one or more aspects of the present disclosure.

FIG. 5 is a flowchart illustrating an example operation of the computing device that is configured to present a graphical keyboard, in accordance with one or more aspects of the present disclosure. The process of FIG. 5 may be performed by one or more processors of a computing device, such as computing devices 110, 210 as illustrated in FIG. 1 and FIG. 2. For purposes of illustration only, FIG. 5 is described below within the context of computing devices 110 and 210 of FIG. 1 and FIG. 2, respectively.

In the example of FIG. 5, a computing device may output, for display, a graphical keyboard comprising a plurality of keys (502). For example, computing device 110 may output user interface 114A including graphical keyboard 116A for display at PSD 112. In some examples, computing device 110 may determine, based on an initial selection of one or more keys from the plurality of keys, one or more candidate words (504). For example, UI module 120 may detect one or more user inputs at PSD 112 and may generate one or more touch events corresponding to the user input. Keyboard module 122 may include a spatial module which may select, based on the touch events, one or more keys corresponding to the user input. Keyboard module 122 may also include a language module, which may identify one or more words within a lexicon. For example, keyboard module 122 may perform a lookup within the lexicon to identify one or more candidate words that include the characters associated with the one or more keys selected by the spatial module. For example, if keyboard module 122 determined that the initial user input corresponds to a selection of the "Z" key, keyboard module 122 may determine that the one or more candidate words include the words within the lexicon that begin with, or include, the letter "z".

In some examples, computing device 110 may determine, based at least in part on the one or more candidate words, a probability that a particular key will be selected after the initial selection of the one or more keys (506). Continuing the example where the initial user input corresponds to a selection of the "Z" key, keyboard module 122 may determine the probability that a particular key will be selected after the "Z" key based on the number (or percentage) of words within the candidate words that include the letter "z" followed by the letter associated with the particular key. For example, if less than 1% of the candidate words begin with, or include, the letters "zw", keyboard module 122 may determine that the probability that the "W" key will be selected is less than 1%. Similarly, if 30% of the candidate words begin with, or include, the letters "ze", keyboard module 122 may determine that the probability that the "E" key will be selected is 30%.

Keyboard module 122 may determine whether the probability that a particular key will be selected after the initial key satisfies a probability threshold (508). For example, keyboard module 122 may compare the probability that the particular key will be selected to a probability threshold (e.g., zero percent, one percent, ten percent, or any other threshold probability). In some examples, keyboard module 122 may determine that the probability satisfies a probability threshold if the probability that a particular key will be selected is greater than the probability threshold.

Responsive to determining that the probability satisfies the probability threshold (508, YES path), the computing device may repeat operation 506 for each of the other keys of the graphical keyboard. For example, if the initial key is the "Z" key and the particular key is the "A" key, and the probability that the "A" key is likely to be selected after the "Z" key is greater than the probability threshold, this may indicate that at least some of the candidate words include the combination of letters "za" such that the letter "a" may be selected next. As a result, keyboard module 122 may refrain from designating the "A" key as an additional key for selecting some other key.

Responsive to determining that the probability does not satisfy a probability threshold (508, NO path), the computing device may output, for display, an updated graphical keyboard that includes a graphical indication designating the area of the graphical keyboard associated with the particular key as being an additional portion of the graphical keyboard for selecting a character associated with an adjacent key (510). In some examples, the graphical indication may include outputting a single key 136 at the same region of PSD 112 at which the particular key and the adjacent key were previously displayed. In some examples, the graphical indication may include changing a display color associated with the particular key and/or the adjacent key. In some examples, the graphical indication may include changing a font (e.g., font type, size, formatting, or other characteristic of the font) associated with the particular key and/or the adjacent key.

In this way, the techniques described in this disclosure may enable a computing device to determine whether a particular key is likely to be selected after an initial key. If the computing device determines that a particular key is not likely to be selected, the techniques described in this disclosure may enable the computing device to output a visual indication designating an area of the graphical keyboard associated with the particular key as being a portion of the graphical keyboard for selecting an adjacent key that is more likely to be selected. By outputting the visual indication, the computing device may select the correct key more frequently. By selecting the correct key more frequently, the computing device may receive fewer inputs to fix incorrect key selections, which may reduce the overall number of user inputs received by the computing device. A computing device that receives fewer inputs may perform fewer operations and, as such, consume less electrical power.

One problem of entering text on a touchscreen keyboard is that the key size is very small, which often leads to erroneous output. Although some touchscreen keyboards may take advantage of a language model technique to auto-correct users' errors, such a correction may not always be reliable. The techniques described in this disclosure may enable a computing device to improve the accuracy of user input. For example, after the user taps a key, the keyboard module may look for the next possible letter by searching through a dictionary. In some examples, if a particular key has a low (e.g. zero) chance of being selected as the next letter, that particular key may be grouped with one of its neighbor keys in order to increase the chance of entering the neighbor key to which the particular key is grouped. For example, assuming a user wants to enter the word "zero", the user may first select the letter "z". In some examples, the keyboard module may then search for the next possible letter in the dictionary. Assuming that there are no (or few) words starting with "zs", "zw", or "zd", but there are many words starting with "ze", the keys "S", "W", and "D" may be grouped to their neighbor key "E". In some examples, after the grouping, any user input landing on one of the "S", "W", "D" or "E" keys may be treated as a selection of the letter "E". As a result, the techniques described in this disclosure may increase the chance of entering the letters "ze". In some examples, the display of the graphical keyboard may change accordingly to reflect the grouping. In some examples, after the user enters the letter "e", the keyboard module may group keys again according the possibility of the next letter.

The following numbered examples may illustrate one or more aspects of the disclosure:

EXAMPLE 1

A method comprising: outputting, by a computing device, for display at a presence-sensitive display, a graphical keyboard comprising a plurality of keys; determining, by the computing device, based on an initial selection of one or more keys from the plurality of keys, one or more candidate words; determining, by the computing device, based on the one or more candidate words, a probability that a particular key will be selected after the initial selection of the one or more keys; and responsive to determining that the probability does not satisfy a probability threshold, outputting, by the computing device, for display at the presence-sensitive display, an updated graphical keyboard that includes a graphical indication designating the an area of the graphical keyboard associated with particular key as being an additional portion of the graphical keyboard for selecting a character associated with an adjacent key.

EXAMPLE 2

The method of example 1, wherein outputting the updated graphical keyboard includes outputting, by the computing device, for display, the graphical indication as a single key at a same region of the presence-sensitive display at which the particular key and the adjacent key were previously displayed.

EXAMPLE 3

The method of example 2, wherein outputting the graphical indication as a single key includes outputting, by the computing device, for display, a character associated with the particular key and the character associated with the adjacent key.

EXAMPLE 4

The method of any of examples 1-3, wherein outputting the updated graphical keyboard includes changing, by the computing device, a display color of the character associated with the particular key such that the display color of the character associated with the particular key is different than a display color of the character associated with the adjacent key.

EXAMPLE 5

The method of any of examples 1-4, wherein outputting the updated graphical keyboard includes changing, by the computing device, a display color of the particular key and the adjacent key from a first color to a second color.

EXAMPLE 6

The method of any of examples 1-5, further comprising: receiving, by the computing device, an indication of a user input at a location of the presence-sensitive display at which the particular key is displayed; mapping, by the computing device, the user input to the adjacent key; and outputting, by the computing device, for display, an edit region comprising one or more characters associated with the initial selection of one or more keys and a character associated with the adjacent key.

EXAMPLE 7

The method of any of examples 1-6, wherein the adjacent key is a first adjacent key, the method further comprising: determining, by the computing device, based on the one or more candidate words, a probability that the first adjacent key will be selected after the initial selection of the one or more keys; and determining, by the computing device, based on the one or more candidate words, a probability that a second adjacent key will be selected after the initial selection of the one or more keys, wherein outputting the updated graphical keyboard is further responsive to determining that the probability that the first adjacent key will be selected is greater than the probability that the second adjacent key will be selected.

EXAMPLE 8

A computing device comprising: a presence-sensitive display; at least one processor; and a memory comprising instructions that, when executed by the at least one processor, cause the at least one processor to: output, for display at the presence-sensitive display, a graphical keyboard comprising a plurality of keys; determine, based on an initial selection of one or more keys from the plurality of keys, one or more candidate words; determine, based on the one or more candidate words, a probability that a particular key will be selected after the initial selection of the one or more keys; and responsive to determining that the probability does not satisfy a probability threshold, output, for display at the presence-sensitive display, an updated graphical keyboard that includes a graphical indication designating an area of the graphical keyboard associated with the particular key as being an additional portion of the graphical keyboard for selecting a character associated with an adjacent key.

EXAMPLE 9

The computing device of example 8, wherein the memory comprises additional instructions that, when executed by the at least one processor, cause the at least one processor to output the updated graphical keyboard by at least outputting, for display, the graphical indication as a single key at a same region of the presence-sensitive screen at which the particular key and the adjacent key were previously displayed.

EXAMPLE 10

The computing device of example 9, wherein the memory comprises additional instructions that, when executed by the at least one processor, cause the at least one processor to output the graphical indication as a single key by at least outputting a character associated with the particular key and the character associated with the adjacent key.

EXAMPLE 11

The computing device of any of examples 8-10, wherein the memory comprises additional instructions that, when executed by the at least one processor, cause the at least one processor to output the updated graphical keyboard by at least changing a display color of the character associated with the particular key such that the display color of the character associated with the particular key is different than a display color of the character associated with the adjacent key.

EXAMPLE 12

The computing device of any of examples 8-11, wherein the memory comprises additional instructions that, when executed by the at least one processor, cause the at least one processor to output the updated graphical keyboard by at least changing a display color of the particular key and the adjacent key from a first color to a second color.

EXAMPLE 13

The computing device of any of examples 8-12, wherein the memory comprises additional instructions that, when executed by the at least one processor, cause the at least one processor to: receive an indication of a user input at a location of the presence-sensitive screen at which the particular key is displayed; map the user input to the adjacent key; and output, for display, an edit region comprising one or more characters associated with the initial selection of one or more keys and a character associated with the adjacent key.

EXAMPLE 14

The computing device of any of examples 8-13, wherein the adjacent key is a first adjacent key, wherein the memory comprises additional instructions that, when executed by the at least one processor, cause the at least one processor to: determine, based on the one or more candidate words, a probability that the first adjacent key will be selected after the initial selection of the one or more keys; and determine, based on the one or more candidate words, a probability that a second adjacent key will be selected after the initial selection of the one or more keys, wherein outputting the updated graphical keyboard is further responsive to determining that the probability that the first adjacent key will be selected is greater than the probability that the second adjacent key will be selected.

EXAMPLE 15

A computer-readable storage medium encoded with instructions that, when executed by at least one processor of a computing device, cause the at least one processor to: output, for display at a presence-sensitive display, a graphical keyboard comprising a plurality of keys; determine, based on an initial selection of one or more keys from the plurality of keys, one or more candidate words; determine, based on the one or more candidate words, a probability that a particular key will be selected after the initial selection of the one or more keys; and responsive to determining that the probability does not satisfy a probability threshold, output, for display at the presence-sensitive display, an updated graphical keyboard that includes a graphical indication designating an area of the graphical keyboard associated with the particular key as being an additional portion of the graphical keyboard for selecting a character associated with an adjacent key.

EXAMPLE 16

The computer-readable storage medium of example 15, comprising additional instructions that, when executed by the at least one processor of the computing device, cause the at least one processor to output the updated graphical keyboard by at least outputting, for display, the graphical indication as a single key at a same region of the presence-sensitive display at which the particular key and the adjacent key were previously displayed.

EXAMPLE 17

The computer-readable storage medium of example 16, comprising additional instructions that, when executed by the at least one processor of the computing device, cause the at least one processor to output the graphical indication as a single key by at least outputting a character associated with the particular key and the character associated with the adjacent key.

EXAMPLE 18

The computer-readable storage medium of any of examples 15-17, comprising additional instructions that, when executed by the at least one processor of the computing device, cause the at least one processor to output the updated graphical keyboard by at least changing a display color of the character associated with the particular key such that the display color of the character associated with the particular key is different than a display color of the character associated with the adjacent key.

EXAMPLE 19

The computer-readable storage medium of any of examples 15-18, comprising additional instructions that, when executed by the at least one processor of the computing device, cause the at least one processor to output the updated graphical keyboard by at least changing a display color of the particular key and the adjacent key from a first color to a second color.

EXAMPLE 20

The computer-readable storage medium of any of examples 15-20, comprising additional instructions that, when executed by the at least one processor of the computing device, cause the at least one processor to: receive an indication of a user input at a location of the presence-sensitive screen at which the particular key is displayed; map the user input to the adjacent key; and output, for display, an edit region comprising one or more characters associated with the initial selection of one or more keys and a character associated with the adjacent key.

EXAMPLE 21

A system comprising means for performing any of the methods of examples 1-7.

EXAMPLE 22

A computing device comprising means for performing any of the methods of examples 1-7.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:

outputting, by a computing device, for display at a presence-sensitive display, a graphical keyboard comprising a plurality of keys;

determining, by the computing device, based on an initial selection of one or more keys from the plurality of keys, one or more candidate words;

determining, by the computing device, based on the one or more candidate words, a probability that a particular key will be selected after the initial selection of the one or more keys; and responsive to determining that the probability does not satisfy a probability threshold, outputting, by the computing device, for display at the presence-sensitive display, an updated graphical keyboard that replaces the particular key and an adjacent key with a single key for selecting a character associated with the adjacent key, wherein the single key indicates that an area of the graphical keyboard associated with the particular key is being designated as an additional portion of the graphical keyboard for selecting the character associated with the adjacent key, wherein the single key includes a character associated with the particular key at a location of the graphical keyboard at which the character associated with the particular key was previously displayed, and wherein the single key includes the character associated with the adjacent key at a location of the graphical keyboard at which the character associated with the adjacent key was previously displayed.

2. The method of claim 1, wherein outputting the updated graphical keyboard includes changing, by the computing device, a display color of the character associated with the particular key such that the display color of the character associated with the particular key is different than a display color of the character associated with the adjacent key.

3. The method of claim 1, wherein outputting the updated graphical keyboard includes changing, by the computing device, a display color of the particular key and the adjacent key from a first color to a second color.

4. The method of claim 1, further comprising:

receiving, by the computing device, an indication of a user input at a location of the presence-sensitive display at which the particular key was displayed prior to displaying the single key;

responsive to receiving the indication of the user input:
  mapping, by the computing device, the user input to the adjacent key; and
  outputting, by the computing device, for display, an edit region comprising one or more characters associated with the initial selection of one or more keys and the character associated with the adjacent key.

5. The method of claim 1, wherein the adjacent key is a first adjacent key, the method further comprising:

determining, by the computing device, based on the one or more candidate words, a probability that the first adjacent key will be selected after the initial selection of the one or more keys; and determining, by the computing device, based on the one or more candidate words, a probability that a second adjacent key will be selected after the initial selection of the one or more keys, wherein outputting the updated graphical keyboard is further responsive to determining that the probability that the first adjacent key will be selected is greater than the probability that the second adjacent key will be selected.

6. A computing device comprising:

a presence-sensitive display;

at least one processor; and a memory comprising instructions that, when executed by the at least one processor, cause the at least one processor to:

output, for display at the presence-sensitive display, a graphical keyboard comprising a plurality of keys;

determine, based on an initial selection of one or more keys from the plurality of keys, one or more candidate words;

determine, based on the one or more candidate words, a probability that a particular key will be selected after the initial selection of the one or more keys; and responsive to determining that the probability does not satisfy a probability threshold, output, for display at the presence-sensitive display, an updated graphical keyboard that replaces the particular key and an adjacent key with a single key for selecting a character associated with the adjacent key, wherein the single key indicates that an area of the graphical keyboard associated with the particular key is being designated as an additional portion of the graphical keyboard for selecting the character associated with the adjacent key, wherein the single key includes a character associated with the particular key at a location of the graphical keyboard at which the character associated with the particular key was previously displayed, and wherein the single key includes the character associated with the adjacent key at a location of the graphical keyboard at which the character associated with the adjacent key was previously displayed.

7. The computing device of claim 6, wherein the memory comprises additional instructions that, when executed by the at least one processor, cause the at least one processor to output the updated graphical keyboard by at least changing a display color of the character associated with the particular key such that the display color of the character associated with the particular key is different than a display color of the character associated with the adjacent key.

8. The computing device of claim 6, wherein the memory comprises additional instructions that, when executed by the at least one processor, cause the at least one processor to output the updated graphical keyboard by at least changing a display color of the particular key and the adjacent key from a first color to a second color.

9. The computing device of claim 6, wherein the memory comprises additional instructions that, when executed by the at least one processor, cause the at least one processor to:

receive an indication of a user input at a location of the presence-sensitive screen at which the particular key was displayed prior to displaying the single key;

responsive to receiving the indication of the user input:
  map the user input to the adjacent key; and
  output, for display, an edit region comprising one or more characters associated with the initial selection of one or more keys and the character associated with the adjacent key.

10. The computing device of claim 6, wherein the adjacent key is a first adjacent key, wherein the memory comprises additional instructions that, when executed by the at least one processor, cause the at least one processor to:
 determine, based on the one or more candidate words, a probability that the first adjacent key will be selected after the initial selection of the one or more keys; and
 determine, based on the one or more candidate words, a probability that a second adjacent key will be selected after the initial selection of the one or more keys,
 wherein outputting the updated graphical keyboard is further responsive to determining that the probability that the first adjacent key will be selected is greater than the probability that the second adjacent key will be selected.

11. A computer-readable storage medium encoded with instructions that, when executed by at least one processor of a computing device, cause the at least one processor to:
 output, for display at a presence-sensitive display, a graphical keyboard comprising a plurality of keys;
 determine, based on an initial selection of one or more keys from the plurality of keys, one or more candidate words;
 determine, based on the one or more candidate words, a probability that a particular key will be selected after the initial selection of the one or more keys; and
 responsive to determining that the probability does not satisfy a probability threshold, output, for display at the presence-sensitive display, an updated graphical keyboard that replaces the particular key and an adjacent key with a single key for selecting a character associated with the adjacent key,
 wherein the single key indicates that an area of the graphical keyboard associated with the particular key is being designated as an additional portion of the graphical keyboard for selecting the character associated with the adjacent key,
 wherein the single key includes a character associated with the particular key at a location of the graphical keyboard at which the character associated with the particular key was previously displayed, and
 wherein the single key includes the character associated with the adjacent key at a location of the graphical keyboard at which the character associated with the adjacent key was previously displayed.

12. The computer-readable storage medium of claim 11, comprising additional instructions that, when executed by the at least one processor of the computing device, cause the at least one processor to output the updated graphical keyboard by at least changing a display color of the character associated with the particular key such that the display color of the character associated with the particular key is different than a display color of the character associated with the adjacent key.

13. The computer-readable storage medium of claim 11, comprising additional instructions that, when executed by the at least one processor of the computing device, cause the at least one processor to output the updated graphical keyboard by at least changing a display color of the particular key and the adjacent key from a first color to a second color.

14. The computer-readable storage medium of claim 11, comprising additional instructions that, when executed by the at least one processor of the computing device, cause the at least one processor to:
 receive an indication of a user input at a location of the presence-sensitive screen at which the particular key was displayed prior to displaying the single key;
 responsive to receiving the indication of the user input:
  map the user input to the adjacent key;
  output, for display, an edit region comprising one or more characters associated with the initial selection of one or more keys and the character associated with the adjacent key; and
  output, for display, a suggested word region comprising:
   a first suggestion comprising the one or more characters associated with the initial selection of the one or more keys and the character associated with the adjacent key; and
   a second suggestion comprising the one or more characters associated with the initial selection of the one or more keys and the character associated with the particular key.

15. The method of claim 4, further comprising:
 outputting, by the computing device, for display, a suggested word region comprising a suggestion that includes the one or more characters associated with the initial selection of the one or more keys and the character associated with the particular key in response to receiving the indication of user input.

16. The method of claim 15, wherein the suggestion is a first suggestion, and wherein the suggested word region further comprises a second suggestion that includes the one or more characters associated with the initial selection of the one or more keys and the character associated with the adjacent key.

17. The computing device of claim 9, wherein the memory comprises additional instructions that, when executed by the at least one processor, cause the at least one processor to:
 output, for display, a suggested word region comprising a suggestion that includes the one or more characters associated with the initial selection of the one or more keys and the character associated with the particular key in response to receiving the indication of user input.

18. The computing device of claim 17, wherein the suggestion is a first suggestion, and wherein the suggested word region further comprises a second suggestion that includes the one or more characters associated with the initial selection of the one or more keys and the character associated with the adjacent key.

19. The method of claim 1, wherein the single key includes a shared border surrounding at least an entire area of the graphical keyboard associated with the particular key and an entire area of the graphical keyboard associated with the adjacent key.

* * * * *